(12) United States Patent
Wakamatsu

(10) Patent No.: US 8,577,479 B2
(45) Date of Patent: Nov. 5, 2013

(54) POWER TRANSMITTING APPARATUS, POWER RECEIVING APPARATUS, POWER TRANSMISSION METHOD, PROGRAM, AND POWER TRANSMISSION SYSTEM

(75) Inventor: Masataka Wakamatsu, Kanagawa (JP)

(73) Assignee: Sony Corporation, Tokyo (JP)

( * ) Notice: Subject to any disclaimer, the term of this patent is extended or adjusted under 35 U.S.C. 154(b) by 394 days.

(21) Appl. No.: 12/428,743

(22) Filed: Apr. 23, 2009

(65) Prior Publication Data
US 2009/0271047 A1 Oct. 29, 2009

(30) Foreign Application Priority Data
Apr. 28, 2008 (JP) ................. P2008-117302

(51) Int. Cl.
| G05B 11/01 | (2006.01) |
| G05D 3/12 | (2006.01) |
| H02J 7/00 | (2006.01) |
| H02J 3/06 | (2006.01) |
| G08B 1/08 | (2006.01) |
| G06F 1/32 | (2006.01) |
| G06Q 50/06 | (2012.01) |
| H02J 7/02 | (2006.01) |
| H02J 3/14 | (2006.01) |
| G08B 25/10 | (2006.01) |

(52) U.S. Cl.
CPC ............ *G06F 1/3203* (2013.01); *G06Q 50/06* (2013.01); *H02J 7/025* (2013.01); *H02J 3/14* (2013.01); *G08B 25/10* (2013.01)
USPC ............. 700/22; 700/286; 320/108; 320/109; 307/32; 307/64; 307/66; 340/539.1; 340/664

(58) Field of Classification Search
USPC ........... 700/22, 295; 307/32, 64, 66; 320/108, 320/109; 340/539.1, 664
See application file for complete search history.

(56) References Cited

U.S. PATENT DOCUMENTS 6,011,323 A * 1/2000 Camp ............................ 307/64
6,208,247 B1 * 3/2001 Agre et al. ............... 340/539.19
(Continued)

FOREIGN PATENT DOCUMENTS

WO WO 2007/026888 A1 3/2007

OTHER PUBLICATIONS

Bagga, N.; Gruntmeir, J.; Lewis, S.; and Senou, F.L., "Wireless Power Transmission-Project 5", Dec. 2004, Thesis, Oklahoma State University School of Electrical and Computer Engineering.*

(Continued)

*Primary Examiner* — Mohammad Ali
*Assistant Examiner* — Kelvin Booker
(74) *Attorney, Agent, or Firm* — Sherr & Jiang, PLLC

(57) ABSTRACT

There is provided a power transmitting apparatus including a power transmission side communication unit for communicating with a power receiving apparatus, a power transmission unit for transmitting power to the power receiving apparatus in a non-contact manner, a transmission power information deriving unit for increasing discretely a first transmission power to transmit from the power transmission unit to the power receiving apparatus, and deriving information related to power transmission for determining a second transmission power corresponding to power desired by the power receiving apparatus based on reception of received power information transmitted from the power receiving apparatus at the power transmission side communication unit, indicating that a received power level meet a predetermined level, and a transmission power determining unit for determining the second transmission power to transmit to the power receiving apparatus based on information related to power transmission derived by the transmission power information deriving unit.

17 Claims, 15 Drawing Sheets

(56) References Cited

U.S. PATENT DOCUMENTS

| | | | |
|---|---|---|---|
| 6,285,251 B1* | 9/2001 | Dent et al. | 330/127 |
| 6,414,955 B1* | 7/2002 | Clare et al. | 370/390 |
| 6,633,026 B2* | 10/2003 | Tuominen | 250/205 |
| 6,661,334 B1* | 12/2003 | Ives et al. | 340/5.64 |
| 6,727,816 B1* | 4/2004 | Helgeson | 340/540 |
| 6,792,259 B1* | 9/2004 | Parise | 320/109 |
| 7,068,991 B2* | 6/2006 | Parise | 320/109 |
| 7,078,666 B2* | 7/2006 | Tuominen et al. | 250/205 |
| 7,106,169 B2* | 9/2006 | Ives et al. | 340/5.64 |
| 7,233,745 B2* | 6/2007 | Loechner | 340/539.1 |
| 7,327,222 B2* | 2/2008 | Peltonen | 340/12.32 |
| 7,400,911 B2* | 7/2008 | Planning et al. | 320/128 |
| 7,412,338 B2* | 8/2008 | Wynans et al. | 700/22 |
| 7,593,642 B2* | 9/2009 | Loechner | 340/539.1 |
| 7,663,502 B2* | 2/2010 | Breed | 340/12.25 |
| 7,671,736 B2* | 3/2010 | Iverson et al. | 340/539.22 |
| 7,772,802 B2* | 8/2010 | Manico et al. | 320/108 |
| 7,831,282 B2* | 11/2010 | Luebke et al. | 455/574 |
| 7,844,306 B2* | 11/2010 | Shearer et al. | 320/108 |
| 7,868,586 B2* | 1/2011 | Petterson et al. | 320/108 |
| 7,915,858 B2* | 3/2011 | Liu et al. | 320/108 |
| 7,948,208 B2* | 5/2011 | Partovi et al. | 320/108 |
| 7,948,209 B2* | 5/2011 | Jung | 320/108 |
| 7,952,322 B2* | 5/2011 | Partovi et al. | 320/108 |
| 7,978,062 B2* | 7/2011 | LaLonde et al. | 340/539.11 |
| 8,030,887 B2* | 10/2011 | Jung | 320/108 |
| 8,030,888 B2* | 10/2011 | Pandya et al. | 320/109 |
| 8,102,147 B2* | 1/2012 | Jung | 320/108 |
| 8,111,041 B2* | 2/2012 | Onishi et al. | 320/108 |
| 8,115,448 B2* | 2/2012 | John | 320/108 |
| 8,155,664 B2* | 4/2012 | McFarland | 340/539.13 |
| 8,169,185 B2* | 5/2012 | Partovi et al. | 320/108 |
| 8,198,858 B2* | 6/2012 | Kim et al. | 320/108 |
| 8,271,015 B2* | 9/2012 | Aoki et al. | 340/539.1 |
| 8,380,255 B2* | 2/2013 | Shearer et al. | 320/108 |
| 8,477,027 B2* | 7/2013 | Givens et al. | 340/539.1 |
| 2002/0010390 A1* | 1/2002 | Guice et al. | 600/300 |
| 2004/0227057 A1* | 11/2004 | Tuominen et al. | 250/205 |
| 2004/0227108 A1* | 11/2004 | Tuominen et al. | 250/551 |
| 2004/0266367 A1* | 12/2004 | Tuominen et al. | 455/91 |
| 2006/0025897 A1* | 2/2006 | Shostak et al. | 701/1 |
| 2006/0113955 A1* | 6/2006 | Nunally | 320/108 |
| 2006/0240790 A1* | 10/2006 | Timmis et al. | 455/127.4 |
| 2006/0266917 A1* | 11/2006 | Baldis et al. | 250/200 |
| 2007/0098407 A1* | 5/2007 | Hebrank et al. | 398/106 |
| 2007/0149162 A1* | 6/2007 | Greene et al. | 455/343.1 |
| 2007/0178929 A1* | 8/2007 | Kim | 455/522 |
| 2007/0227572 A1* | 10/2007 | Piasecki et al. | 136/205 |
| 2008/0035145 A1* | 2/2008 | Adams et al. | 128/204.18 |
| 2008/0145061 A1* | 6/2008 | Lee et al. | 370/280 |
| 2008/0186129 A1* | 8/2008 | Fitzgibbon | 340/5.2 |
| 2008/0258679 A1* | 10/2008 | Manico et al. | 320/106 |
| 2008/0300660 A1* | 12/2008 | John | 607/61 |
| 2009/0045772 A1* | 2/2009 | Cook et al. | 320/108 |
| 2009/0058361 A1* | 3/2009 | John | 320/128 |
| 2009/0143044 A1* | 6/2009 | Thorson et al. | 455/404.1 |
| 2009/0243397 A1* | 10/2009 | Cook et al. | 307/104 |
| 2009/0254766 A1* | 10/2009 | Yamasuge | 713/300 |
| 2009/0271048 A1* | 10/2009 | Wakamatsu | 700/296 |
| 2009/0284220 A1* | 11/2009 | Toncich et al. | 320/108 |
| 2009/0303693 A1* | 12/2009 | Mao | 361/818 |
| 2010/0061733 A1* | 3/2010 | Loechner | 340/539.1 |
| 2010/0156343 A1* | 6/2010 | Jung | 320/108 |
| 2010/0200039 A1* | 8/2010 | Piasecki et al. | 136/205 |
| 2010/0225271 A1* | 9/2010 | Oyobe et al. | 320/108 |
| 2010/0231163 A1* | 9/2010 | Mashinsky | 320/108 |
| 2010/0283599 A1* | 11/2010 | Ma et al. | 340/539.1 |
| 2010/0315045 A1* | 12/2010 | Zeine | 320/137 |
| 2010/0327766 A1* | 12/2010 | Recker et al. | 315/291 |
| 2011/0006893 A1* | 1/2011 | Finch et al. | 340/539.1 |
| 2011/0031928 A1* | 2/2011 | Soar | 320/108 |
| 2011/0057610 A1* | 3/2011 | Yamazaki et al. | 320/108 |
| 2011/0074347 A1* | 3/2011 | Karalis et al. | 320/108 |
| 2011/0121654 A1* | 5/2011 | Recker et al. | 307/66 |
| 2011/0121778 A1* | 5/2011 | Oyobe et al. | 320/108 |
| 2011/0133655 A1* | 6/2011 | Recker et al. | 315/159 |
| 2011/0181238 A1* | 7/2011 | Soar | 320/108 |
| 2011/0227528 A1* | 9/2011 | Karalis et al. | 320/108 |
| 2011/0227530 A1* | 9/2011 | Karalis et al. | 320/108 |
| 2011/0241618 A1* | 10/2011 | Karalis et al. | 320/108 |
| 2011/0291615 A1* | 12/2011 | Pandya et al. | 320/108 |
| 2012/0026726 A1* | 2/2012 | Recker et al. | 362/157 |
| 2012/0043889 A1* | 2/2012 | Recker et al. | 315/86 |
| 2012/0080944 A1* | 4/2012 | Recker et al. | 307/25 |
| 2012/0098432 A1* | 4/2012 | Recker et al. | 315/86 |
| 2012/0206096 A1* | 8/2012 | John | 320/108 |
| 2012/0269181 A1* | 10/2012 | Gonikberg et al. | 370/336 |

OTHER PUBLICATIONS

Correia, L.H.A.; Macedo, D.F.; Silva, D.A.C.; Santos, A.L.D.; Loureiro, A.A.F.; and Nogueira, J.M.S., "Transmission Power Control in MAC Protocols for Wireless Sensor Networks", Jun. 2005, Universidade Federal De Minas Gerais Department of Computer Science.*

Deller, D.; Dew, S.; Freeman, J.; Jordan, C.; Lecture, R.; and Little, M., "Wireless Power", Sep. 2008, Thesis, Georgia Institute of Technology Department of Electrical and Computer Engineering.*

Gao, J., "Traveling Magnetic Field for Homogeneous Wireless Power Transmission", Jan. 2007, IEEE Transactions on Power and Delivery, vol. 22, No. 1.*

Kopparthi, S., "Remote Power Delivery and Signal Amplification for Mems Applications", Dec. 2003, Graduate Thesis, Department of Electrical and Computer Engineering, Louisiana State University and Agricultural and Mechanical College.*

Lee, S.-W.; Kim, J.-D.; Son, J.-H.; Ryu, M.-H.; and Kim, J., "Design of Two-Dimensional Coils for Wireless Power Transmission to In Vivo Robotic Capsule", Sep. 2005, Proceedings of the 2005 IEEE Conference on Engineering in Medicine and Biology.*

Payne, J.; Song, K.D.; Yang, S.Y.; Kim, J.; Park, Y.; and Choi, S.H., "Wireless Power Transmission for Medical Applications", 2009, Proceedings of the SPIE, vol. 7291.*

Youn, D.G.; Park, Y.-H.; Kim, K.-H.; and Rhee, Y.-C., "A Study on the Fundamental Transmission Experiment for Wireless Power Transmission System", 1999, 1999 IEEE TENCON.*

Marin Soljacic et al., "Development of Technique for Wireless Transmission of Electric Power", MIT, Physics Department, pp. 117-128, Dec. 3, 2007.

International Search Report mailed Nov. 7, 2006, in PCT/JP2006/317369.

* cited by examiner

POWER TRANSMITTING APPARATUS, POWER RECEIVING APPARATUS, POWER TRANSMISSION METHOD, PROGRAM, AND POWER TRANSMISSION SYSTEM

BACKGROUND OF THE INVENTION

1. Field of the Invention

The present invention relates to a power transmitting apparatus, a power receiving apparatus, a power transmission method, a program, and a power transmission system.

2. Description of the Related Art

In recent years, the power transmission system capable of transmitting power between devices in a non-contact manner is being widely used. Such power transmission system includes an IC card system using a reader/writer (one example of power transmitting apparatus) and an IC card (one example of power receiving apparatus) such as electronic money system, ticket system of transportation means, and admission system using employee ID card.

A technique of transmitting power of larger capacity to a farther distance is being developed. The technique of transmitting power using electric field or magnetic field resonance is described, for example, in Marin Soljacic, Aristeidis Karalis, John Joannopoulos, Andre Kurs, Robert Moffatt, Peter Fisher, "Develop technique of wirelessly transmitting power, light a 60 W light bulb in the experiment" Nikkei Business Publications 12-3, 2007, pp. 117-128.

SUMMARY OF THE INVENTION

As power of larger capacity can be transmitted to a power receiving apparatus of farther distance in the power transmission system of transmitting power in a non-contact manner, the convenience enhances, and the application thereof can further extend.

However, as opposed to a case of transmitting power in a contact manner through a cable, and the like, the state related to transmission of power between the power transmitting apparatus and the power receiving apparatus is not necessarily constant when transmitting power in a non-contact manner. The state related to transmission of power can change by the relationship of the direction of the power transmitting antenna of the power transmitting apparatus and the direction of the power receiving antenna of the power receiving apparatus, and whether or not an obstacle is present between the power transmitting apparatus and the power receiving apparatus. If the state related to transmission of power is not constant, various drawbacks may occur in the power receiving apparatus such as the power receiving apparatus may not receive the power necessary to operate from the power transmitting apparatus, or the power receiving apparatus receives power overly exceeding the power necessary for the power receiving apparatus to operate even if the power transmitting apparatus transmits a certain power at which the power receiving apparatus normally operated. The possibility various drawbacks occur in the power receiving apparatus becomes higher the more the power of larger capacity can be transmitted to farther distance.

The present invention addresses the above-identified, and other issues associated with methods in related art and apparatuses, and it is desirable to provide a new and improved power transmitting apparatus capable of transmitting power based on the state related to transmission of power between the power transmitting apparatus and the power receiving apparatus from the power transmitting apparatus to the power receiving apparatus, a power receiving apparatus, a power transmission method, a program and a power transmission system.

According to an embodiment of the present invention, there is provided a power transmitting apparatus including a power transmission side communication unit for communicating with a power receiving apparatus for receiving transmitted power; a power transmission unit for transmitting power to the power receiving apparatus in a non-contact manner; a transmission power information deriving unit for increasing, discretely a first transmission power to transmit from the power transmission unit to the power receiving apparatus, and deriving information related to power transmission for determining a second transmission power corresponding to power desired by the power receiving apparatus based on reception of received power information transmitted from the power receiving apparatus at the power transmission side communication unit, indicating that a received power level meet a predetermined level; and a transmission power determining unit for determining the second transmission power to transmit to the power receiving apparatus based on information related to power transmission derived by the transmission power information deriving unit.

According to such configuration, power based on the state related to transmission of power between the power transmitting apparatus and the power receiving apparatus can be transmitted to the power receiving apparatus.

The transmission power information deriving unit may derive a coupling coefficient with the power receiving apparatus as information related to power transmission.

The power transmission side communication unit may further receive first power consumption information indicating a power consumption desired to detect that the received power level meet the predetermined level in the power receiving apparatus; and the transmission power information deriving unit may derive the coupling coefficient based on the first transmission power of when the power transmission side communication unit receives the received power information, and the first power consumption information.

The power transmission side communication unit may further receive a second power consumption indicating a power consumption desired for the power receiving apparatus to operate; and the transmission power determining unit determines the second transmission power based on the coupling coefficient derived by the transmission power information deriving unit and the second power consumption information.

The transmission power information deriving unit may transmit a start notification to start transmission of the first transmission power to the power transmission side communication unit, and transmit the first transmission power from the power transmission unit after the transmission of the start notification.

According to the embodiment of the present invention described above, there is provided a power receiving apparatus including a power receiving side communication unit for communicating with a power transmitting apparatus for transmitting power; a power reception unit for receiving power transmitted from the power transmitting apparatus in a non-contact manner; a received power level detection unit for outputting a detection result corresponding to the received power level based on a first transmission power transmitted from the power transmitting apparatus; and a control unit for transmitting received power information indicating that the received power level meet a predetermined level from the power receiving side communication unit based on the detection result of the received power level detection unit.

According to such configuration, power based on the state related to transmission of power between the power transmitting apparatus and the power receiving apparatus can be received from the power transmitting apparatus. The phrase "output of detection result corresponding to the received power level" may be realized by changing discretely the detection level of the received power level detection unit under a constant first transmission power.

The received power level detection unit may include a light emitting element which light emission amount changes according to a current amount corresponding to the power received by the power reception unit, and a photoelectric transducer for outputting a detection signal corresponding to the light emission amount of the light emitting element.

The received power level detection unit may emit light by the light emission of the light emitting element to outside.

A switching unit for selectively transmitting the power received by the power reception unit to the received power level detection unit in response to a control signal transmitted from the control unit may be further arranged, wherein the control unit transmits the control signal to the switching unit when the power receiving side communication unit receives a start notification to start transmission of the first transmission power transmitted from the power transmitting apparatus.

The control unit may transmit a first power consumption indicating a power consumption desired to detect that the received power level meet the predetermined level, and a second power consumption indicating a power consumption necessary for operation from the power receiving side communication unit when the power receiving side communication unit receives the start notification to start transmission of the first transmission power transmitted from the power transmitting apparatus.

According to the embodiment of the present invention described above, there is provided a power transmission method including the steps of: transmitting a first transmission power to a power receiving apparatus for receiving a transmitted power, the first transmission power increased discretely; receiving received power information indicating that a received power level transmitted from the power receiving apparatus meet a predetermined level based on a reception of the first transmission power; deriving information related to power transmission for determining a second transmission power corresponding to a power desired by the power receiving apparatus based on the reception of the received power information; determining the second transmission power to transmit to the power receiving apparatus based on the information related to power transmission; and transmitting the determined second transmission power to the power receiving apparatus.

Through the use of such method, power based on the state related to transmission of power between the power transmitting apparatus and the power receiving apparatus can be transmitted to the power receiving apparatus.

According to the embodiments of the present invention described above, there is provided a program for causing a computer to execute the steps of: transmitting a first transmission power to a power receiving apparatus for receiving a transmitted power, the first transmission power increased discretely; receiving received power information indicating that a received power level transmitted from the power receiving apparatus meet a predetermined level based on a reception of the first transmission power; deriving information related to power transmission for determining a second transmission power corresponding to a power desired by the power receiving apparatus based on the reception of the received power information; determining the second transmission power to transmit to the power receiving apparatus based on the information related to power transmission; and transmitting the determined second transmission power to the power receiving apparatus.

According to such program, power based on the state related to transmission of power between the power transmitting apparatus and the power receiving apparatus can be transmitted to the power receiving apparatus.

According to the embodiments of the present invention described above, there is provided a power transmission system including a power transmitting apparatus for transmitting power; and a power receiving apparatus for receiving power transmitted by the power transmitting apparatus, wherein the power transmitting apparatus includes, a power transmission side communication unit for communicating with the power receiving apparatus, a power transmission unit for transmitting power to the power receiving apparatus in a non-contact manner, a transmission power information deriving unit for increasing discretely a first transmission power to transmit from the power transmission unit to the power receiving apparatus, and deriving information related to power transmission for determining a second transmission power corresponding to power desired by the power receiving apparatus based on reception of received power information transmitted from the power receiving apparatus at the power transmission side communication unit, indicating that a received power level meet a predetermined level, and a transmission power determining unit for determining the second transmission power to transmit to the power receiving apparatus based on information related to power transmission derived by the transmission power information deriving unit, and the power receiving apparatus includes a power receiving side communication unit for communicating with the power transmitting apparatus, a power reception unit for receiving power transmitted from the power transmitting apparatus in a non-contact manner, a received power level detection unit for outputting a detection result corresponding to the received power level based on a first transmission power transmitted from the power transmitting apparatus, and a control unit for transmitting the received power information from the power receiving side communication unit based on the detection result of the received power level detection unit.

According to such configuration, a power transmission system in which power based on the state related to transmission of power between the power transmitting apparatus and the power receiving apparatus can be transmitted from the power transmitting apparatus to the power receiving apparatus is realized.

According to the embodiments of the present invention described above, power based on the state related to transmission of power between the power transmitting apparatus and the power receiving apparatus can be transmitted from the power transmitting apparatus to the power receiving apparatus.

DETAILED DESCRIPTION OF THE PREFERRED EMBODIMENTS

Figure 1:
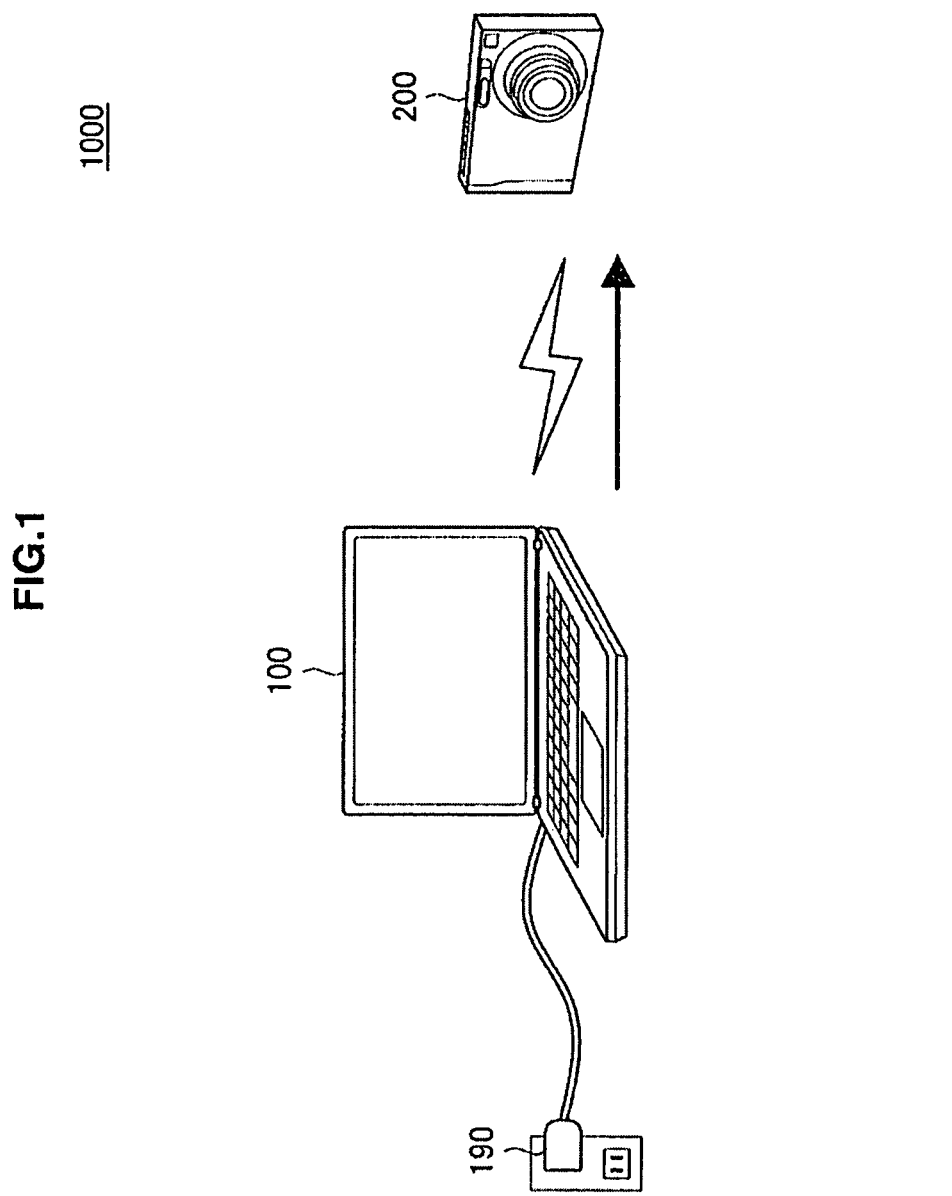
FIG. 1 is an explanatory view showing an outline of a power transmission system according to an embodiment of the present invention.

Hereafter, preferred embodiments of the present invention will be described in detail with reference to the appended drawings. Note that in this specification and the appended drawings, structural elements that have substantially the same functions and structures are denoted with the same reference numerals and a repeated explanation of these structural elements is omitted.

(Power Transmission System According to Embodiment of the Present Invention)

FIG. 1 is an explanatory view showing an outline of a power transmission system 1000 according to an embodiment of the present invention. With reference to FIG. 1, the power transmission system 1000 includes a power transmitting apparatus 100 for transmitting power, and a power receiving apparatus 200 for receiving the power transmitted by the power transmitting apparatus 100 in a non-contact manner (wirelessly). In FIG. 1, an example where the power transmitting apparatus 100 is externally transmitted with power through an outlet 190 is shown, but this is not the only case. In FIG. 1, one power receiving apparatus 200 is shown for the power receiving apparatus for receiving the power transmitted from the power transmitting apparatus 100, but the power transmission system according to the embodiment of the present invention is not limited thereto, and the power transmitting apparatus 100 can transmit power to each of a plurality of power receiving apparatuses.

When transmitting power in a non-contact manner as shown in FIG. 1, the state related to transmission of power between the power transmitting apparatus 100 and the power receiving apparatus 200 is not necessarily constant. The power transmitting apparatus 100 configuring the power transmission system 1000 grasps the state related to transmission of power between the power transmitting apparatus 100 and the power receiving apparatus 200, and determines the power to transmit to the power receiving apparatus 200 based on the grasped state related to transmission of power. The power transmitting apparatus 100 then can transmit the power corresponding to the state related to transmission of power at before transmission of power to the power receiving apparatus 200.

[Power Transmission Method in Power Transmission System 1000]

The power transmission method in the power transmission system 1000 according to the embodiment of the present invention will be more specifically described. In the power transmission system 1000, the power transmitting apparatus 100 derives information related to power transmission to grasp the state related to transmission of power between the power transmitting apparatus 100 and the power receiving apparatus 200. The information related to power transmission is the information for determining the transmission power (hereinafter referred to as "second transmission power" corresponding to the power desired by the power receiving apparatus 200. The information related to transmission of power includes a coupling coefficient κ between the power transmitting apparatus 100 and the power receiving apparatus 200, but is not limited thereto. An example where the power transmitting apparatus 100 derives the coupling coefficient κ as the information related to transmission of power will be described below by way of example.

Figure 2:
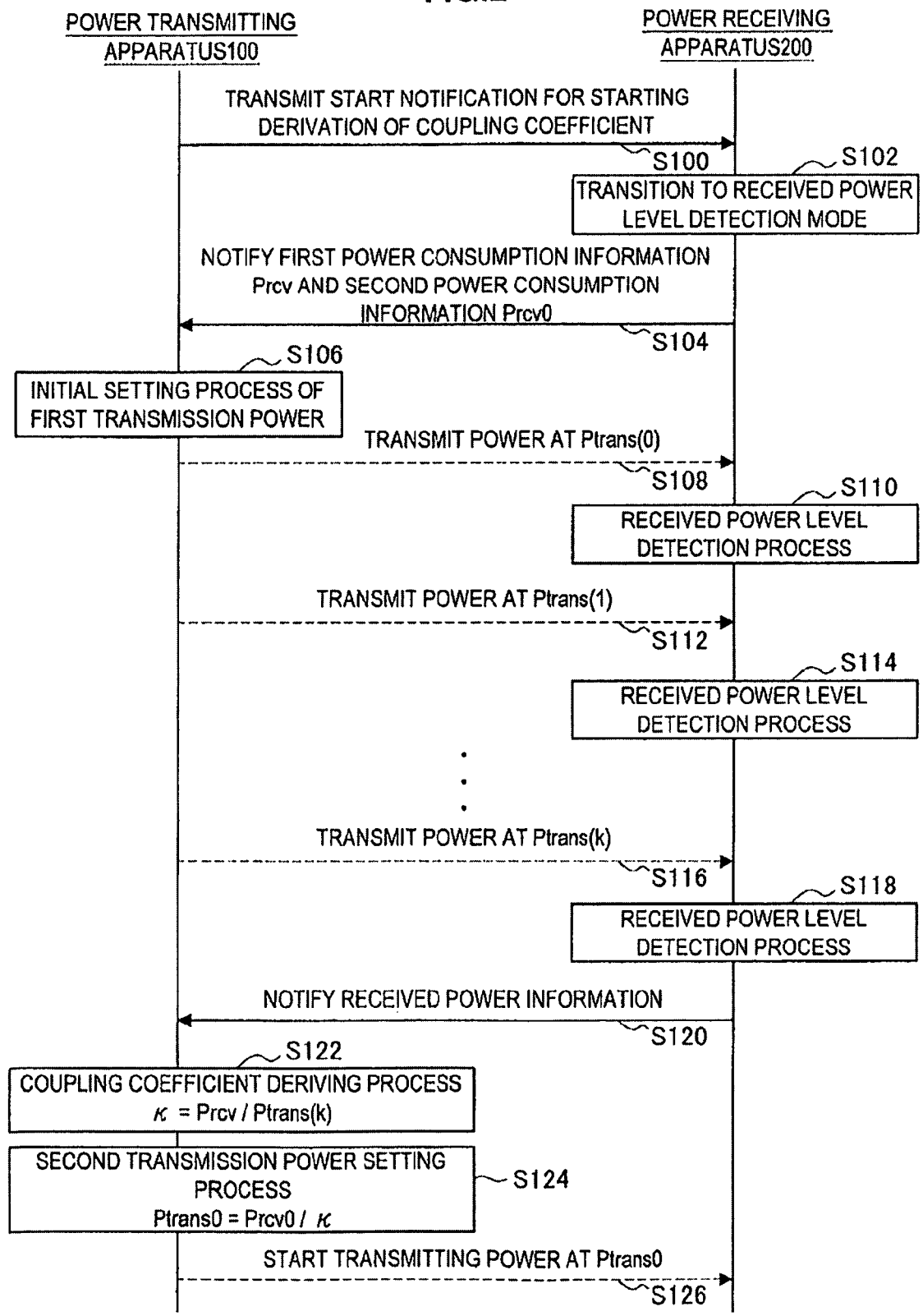
FIG. 2 is an explanatory view showing one example of a power transmission method in the power transmission system according to the embodiment of the present invention.

FIG. 2 is an explanatory view showing one example of a power transmission method in the power transmission system 1000 according to the embodiment of the present invention. FIG. 2 shows one example of the power transmission method when the power transmitting apparatus 100 derives the coupling coefficient κ as the information related to transmission of power.

The power transmitting apparatus 100 transmits to the power receiving apparatus 200 a start notification to start deriving the coupling coefficient κ (S100). The start notification of step S100 corresponds to the start notification of starting the transmission of the first transmission power (hereinafter described) corresponding to step S108, step S112, and step S116.

The power receiving apparatus 200 receiving the start notification transmitted from the power transmitting apparatus 100 in step S100 transitions to a received power level detection mode (S102). The detection of the received power level in the power receiving apparatus 200 corresponds to detecting whether or not the received power level meets a predetermined level. The power receiving apparatus 200 can perform the process of step S102 by selectively validating a received power level detection circuit for detecting the received power level in response to the start notification.

The power receiving apparatus 200 transitioned to the received power level detection mode in step S102 notifies first power consumption information Prcv and second power consumption information Prcv0 to the power transmitting apparatus 100 (S104). The first power consumption information Prcv is the information indicating the power consumption necessary for detecting that the received power level meet the predetermined level in the power receiving apparatus 200. The second power consumption information Prcv0 is the information indicating the power consumption necessary for operating the power receiving apparatus 200. In FIG. 2, an example where the power receiving apparatus 200 notifies the first power consumption information Prcv and the second power consumption information Prcv0 to the power transmitting apparatus 100 after step S102 is shown, but the power transmission method according to the embodiment of the present invention is not limited thereto. For instance, the power receiving apparatus 200 may notify the first power consumption information Prcv and the second power consumption information Prcv0 to the power transmitting apparatus 100 before receiving the start notification in step S100, or in advance.

The power transmitting apparatus 100 receiving the first power consumption information Prcv and the second power consumption information Prcv0 in step S104 performs an initial setting of a first transmission power (S106). The first transmission power is the transmission power for deriving the information related to power transmission. The power transmitting apparatus 100 increases discretely the first transmission power to transmit to the power receiving apparatus 200 until receiving received power information indicating that the received power level meet the predetermined level transmitted from the power receiving apparatus 200. The power transmitting apparatus 100 can derive the coupling coefficient κ corresponding to the state related to transmission of power while reducing the possibility of transmitting a power overly exceeding the power necessary for the power receiving apparatus 200 to operate by increasing discretely the first transmission power. Therefore, the power transmitting apparatus 100 performs the initial setting of the first transmission power in step S106 to derive the coupling coefficient κ corresponding to the state related to transmission of power.

After the initial setting of the first transmission power in step S106, the power transmitting apparatus 100 transmits a first transmission power Ptrans(0) corresponding to the initial value to the power receiving apparatus 200 (S108).

The power receiving apparatus 200 receiving the first transmission power Ptrans(0) transmitted in step S108 performs a received power level detection process of detecting whether the received power level meets a predetermined level based on the first transmission power Ptrans(0) (S110).

If detected that the received power level meets the predetermined level in the received power level detection process, the power receiving apparatus 200 transmits to the power transmitting apparatus 100 the received power information indicating that the received power level meet the predetermined level. If not detected that the received power level meet the predetermined level in the received power level detection process, the power receiving apparatus 200 does not perform a particular communication with the power transmitting apparatus 100. FIG. 2 shows a case where the power receiving apparatus 200 did not detect that the received power level meets the predetermined level in step S110. It should be recognized that in the case where it is not detected that the received power level meets the predetermined level in the received power level detection process, the power receiving apparatus 200 according to the present embodiment may notify the power transmitting apparatus 100 that detection is not made.

If the received power information with respect to the first transmission power Ptrans(0) transmitted in step S108 is not received, the power transmitting apparatus 100 transmits the first transmission power Ptrans(1), which power is pulled up by one stage, to the power receiving apparatus 200 (S112). The power receiving apparatus 200 receiving the first transmission power Ptrans(1) transmitted in step S112 performs the received power level detection process of detecting whether the received power level meets a predetermined level based on the first transmission power Ptrans(1), similar to step S110 (S114). FIG. 2 shows a case where the power receiving apparatus 200 did not detect that the received power level meets the predetermined level in step S110. If the power receiving apparatus 200 does not detect that the received power level meets the predetermined level, the power transmitting apparatus 100 repeats the process similar to step S112 until the first transmission power becomes a value corresponding to the maximum value, for example.

Similar to step S112, the power transmitting apparatus 100 transmits to the power receiving apparatus 200 a first transmission power Ptrans(k) (k is a positive integer), which power is pulled up by one stage, when the received power information is not received (S116). The power receiving apparatus 200 receiving the first transmission power Ptrans(k) transmitted in step S116 performs the received power level detection process of detecting whether the received power level meets a predetermined level based on the first transmission power Ptrans(k), similar to step S110 (S118).

If detected that the received power level meets the predetermined level in step S118, the power receiving apparatus 200 transmits the received power information to the power transmitting apparatus 100 (S120). The power receiving apparatus 200 cancels the received power level detection mode after transmitting the received power information, and transitions to the normal operation mode (state capable of executing the function of the power receiving apparatus 200. State of performing the normal operation).

When receiving the received power information transmitted in step S120, the power transmitting apparatus 100 derives the coupling coefficient κ based on the first transmission power Ptrans(k) of when receiving the received power information and the first power consumption information Prcv received in step S104 (S122). More specifically, the power transmitting apparatus 100 derives the coupling coefficient κ from the following Formula 1.

$$\kappa = Prcv/Ptrans(k) \quad \text{(Formula 1)}$$

After deriving the coupling coefficient κ in step S122, the power transmitting apparatus 100 sets the second transmission power Ptrans0 corresponding to the power desired by the power receiving apparatus 200 based on the derived coupling coefficient κ and the second power consumption information Prcv0 received in step S104 (S124). More specifically, the power transmitting apparatus 100 derives the second transmission power Ptrans0 from the following Formula 2.

$$Ptrans0 = Prcv0/\kappa \quad \text{(Formula 2)}$$

As shown in Formula 2, the second transmission power Ptrans0 derived from Formula 2 becomes a value dependent on the coupling coefficient κ. Therefore, the power transmitting apparatus 100 can set the second transmission power Ptrans0 corresponding to the power desired by the power receiving apparatus 200 as the value corresponding to the state related to transmission of power at before the transmission of power.

After setting the second transmission power Ptrans0 in step S124, the power transmitting apparatus 100 transmits the second transmission power Ptrans0 to the power receiving apparatus 200 (S126).

In the power transmission system 1000, the second transmission power Ptrans0 corresponding to the state related to transmission of power at before the transmission of power can be transmitted from the power transmitting apparatus 100 to the power receiving apparatus 200 by using the power transmission method shown in FIG. 2.

Figure 3:
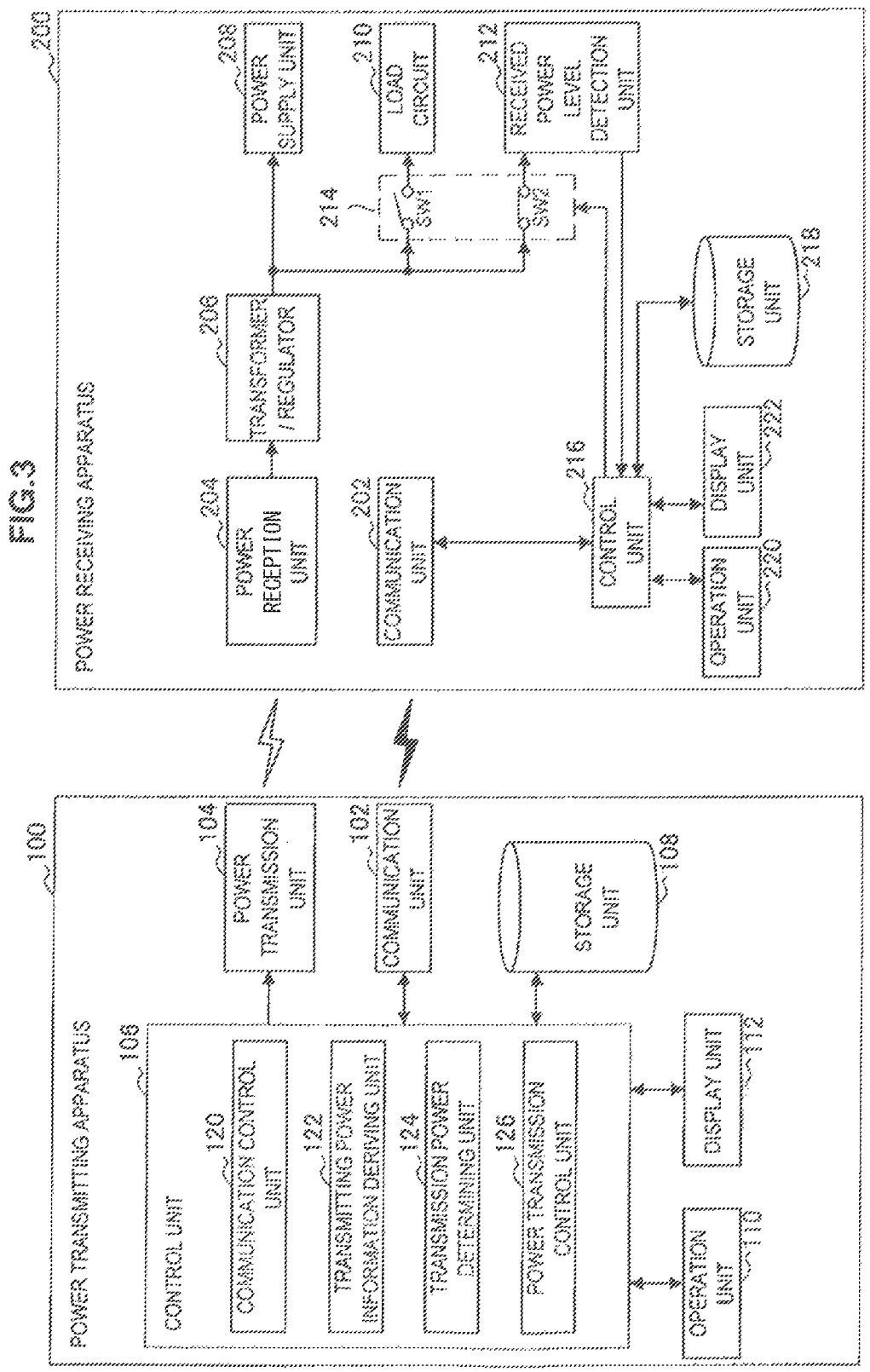
FIG. 3 is an explanatory view showing one example of a configuration of the power transmission system according to the embodiment of the present invention.

The power transmitting apparatus 100 and the power receiving apparatus 200 configuring the power transmission system 1000 capable of realizing the above-described power transmission method will be described below. FIG. 3 is an explanatory view showing one example of a configuration of the power transmission system 1000 according to the embodiment of the present invention. As shown in FIG. 3, the power transmitting apparatus 100 and the power receiving apparatus 200 transmit power in a non-contact manner.

Before describing the configurations of the power transmitting apparatus 100 and the power receiving apparatus 200 configuring the power transmission system 1000, the power transmitting means according to the embodiment of the present invention will be first described. The power transmitting means will be described below focusing on a power transmission unit 104 arranged in the power transmitting apparatus 100 and a power reception unit 204 arranged in the power receiving apparatus 200 shown in FIG. 3.

[Power Transmitting Means According to Embodiment of the Present Invention]

Figure 4:
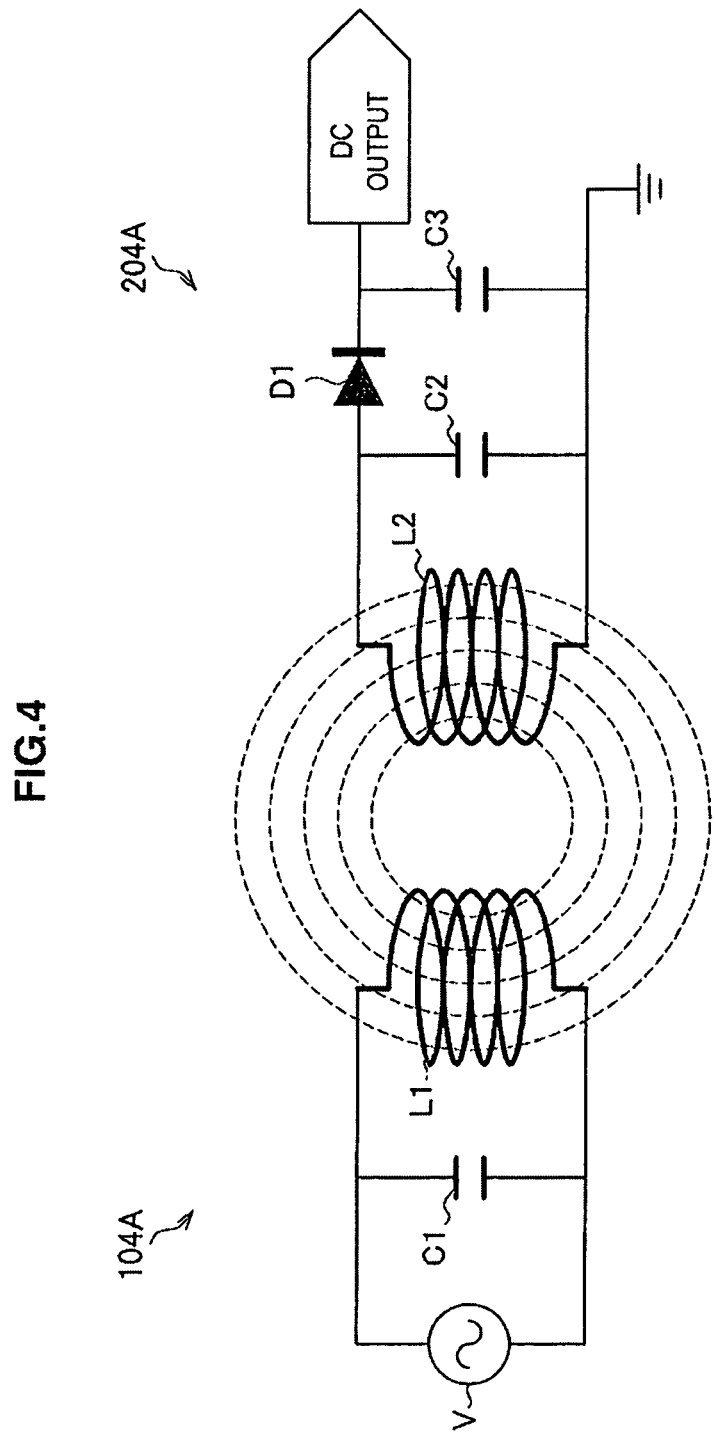
FIG. 4 is an explanatory view describing a first power transmitting means according to the embodiment of the present invention.

[1] First Transmitting Means: Transmission of Power Using Electromagnetic Induction FIG. 4 is an explanatory view describing the first power transmitting means according to the embodiment of the present invention. FIG. 4 shows a configuration example of the power transmission unit 104A of the power transmitting apparatus 100 that transmits power using electromagnetic induction and the power reception unit 204A of the power receiving apparatus 200.

With reference to FIG. 4, the power transmission unit 104A includes an AC power supply V, a capacitor C1, and an inductor L1. The power reception unit 204A includes an inductor L2, a capacitor C2, a capacitor C3, and a diode D1. The power transmission unit 104A flows AC current to the inductor L1 by the AC power supply V, and generates a magnetic flux at the periphery of the inductor L1. The power reception unit 204A obtains a DC current by rectifying the AC current flowed to the inductor L2 by the magnetic flux with the diode D1 and the capacitor C3. Therefore, the power receiving apparatus 200 applied with the first transmitting means can obtain power from the power transmitting apparatus 100.

When employing the power transmitting means using the electromagnetic induction as shown in FIG. 4, for example, the transmission efficiency of power is varied by changing the number of windings and the arrangement position of the inductor L1 and the inductor L2 to thereby optimize the transmission efficiency.

[2] Second Transmitting Means: Transmission of Power Using Electric Wave

Figure 5:
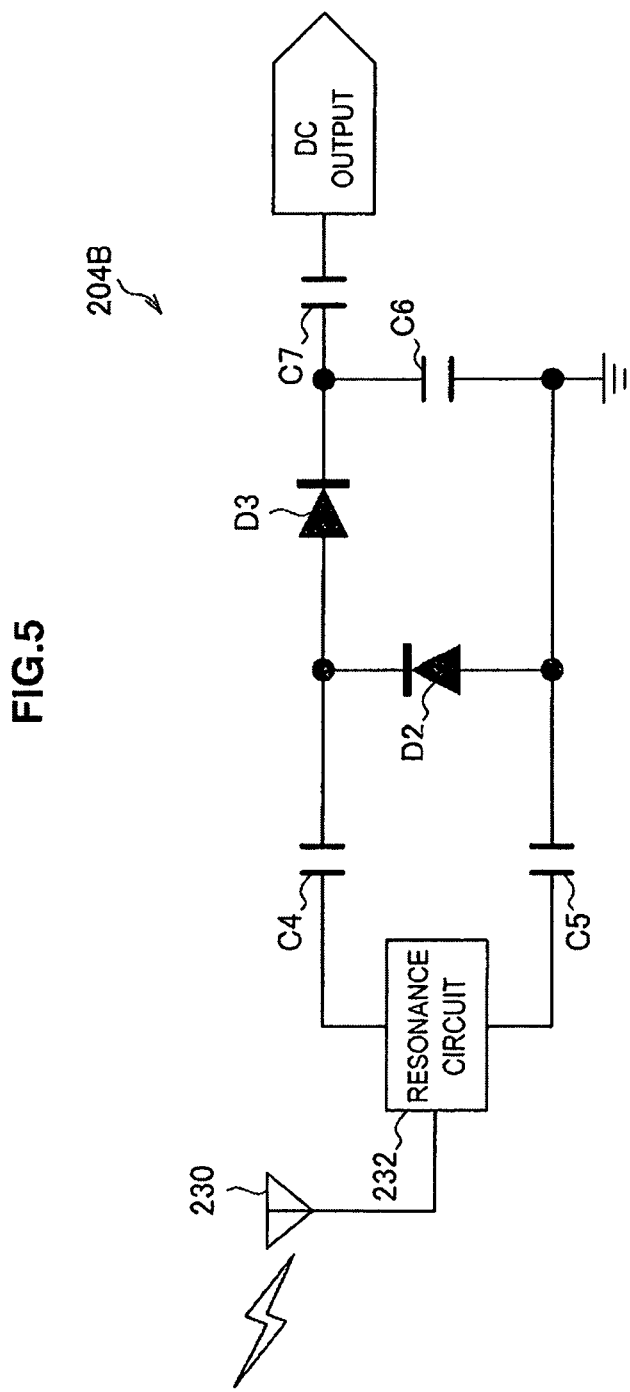
FIG. 5 is an explanatory view describing a second power transmitting means according to the embodiment of the present invention.

FIG. 5 is an explanatory view describing the second power transmitting means according to the embodiment of the present invention. FIG. 5 shows a configuration example of a power reception unit 204B of the power receiving apparatus 200 that receives power using electric wave.

As shown in FIG. 5, the power reception unit 204B includes an antenna 230, a resonance circuit 232, a capacitor C4, a capacitor C5, a diode D2, a diode D3, a capacitor C6, and a capacitor C7. The resonance circuit 232 is configured by a capacitor having a predetermined electrostatic capacity and an inductor having a predetermined inductance. In the above configuration, when the antenna 230 receives the electric wave transmitted from a power transmission unit 104B (not shown) of the power transmitting apparatus 100, the AC current is supplied from the antenna 230 to the resonance circuit 232, and the resonance circuit 232 amplifies the AC current by resonance. Furthermore, the power reception unit 204B extracts the DC component and obtains the DC current by rectifying the amplified AC current with a rectifier circuit including the diode D3 and the capacitor C6. Therefore, the power receiving apparatus 200 applied with the second transmitting means can obtain power from the power transmitting apparatus 100.

Figure 6:
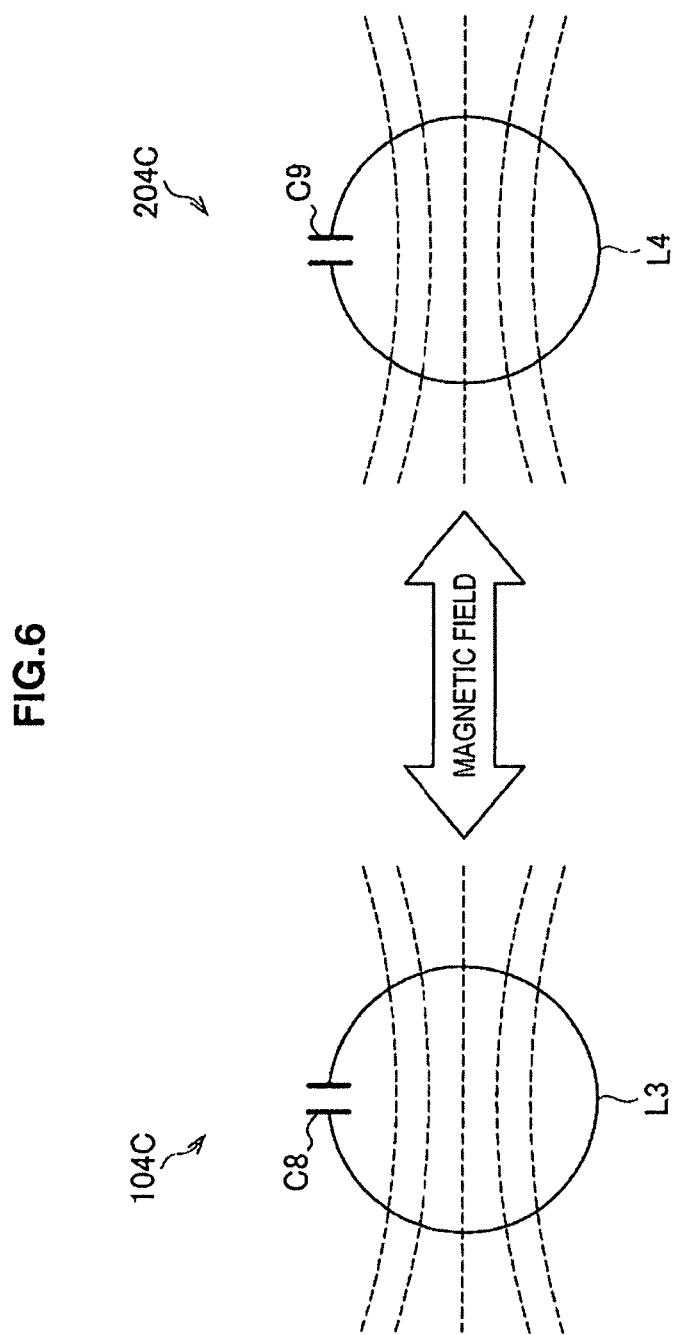
FIG. 6 is an explanatory view describing a third power transmitting means according to the embodiment of the present invention.

[3] Third Transmitting Means: Transmission of Power Using Magnetic Field Resonance FIG. 6 is an explanatory view describing the third power transmitting means according to the embodiment of the present invention. FIG. 6 shows a configuration example of a power transmission unit 104C of the power transmitting apparatus 100 and a power reception unit 204C of the power receiving apparatus 200, which perform reception of power using magnetic field resonance.

The power transmission unit 104C includes a resonance circuit with a capacitor C8 and an inductor L3 as shown in FIG. 6, and an AC power supply (not shown) or the like is connected to the resonance circuit. The power reception unit 204C includes a capacitor C9 and an inductor L4. The third transmitting means is a transmitting means that uses the principle of resonance that when two transducers having unique number of vibrations are lined, the vibration applied to one transducer is also transmitted to the other transducer. Therefore, the transmission efficiency can be optimized by adjusting the respective electrostatic capacity and the inductance such that the resonance frequency by the capacitor C8 and the inductor L3 of the power transmission unit 104C and the resonance frequency by the capacitor C9 and the inductor L4 of the power reception unit 204C become equal. Through the use of the principle of resonance described above, the power receiving apparatus 200 applied with the third transmitting means can obtain power from the power transmitting apparatus 100.

The power transmission (third transmitting means) using the principle of resonance as described above has higher power transmission efficiency than the transmission of power using electromagnetic induction (first transmitting means) and the transmission of power using electric wave (second transmitting means). The power receiving apparatus 200 applied with the third transmitting unit can receive a power of about a few kilowatts if the distance with the power transmitting apparatus 100 is a few meters.

Figure 7:
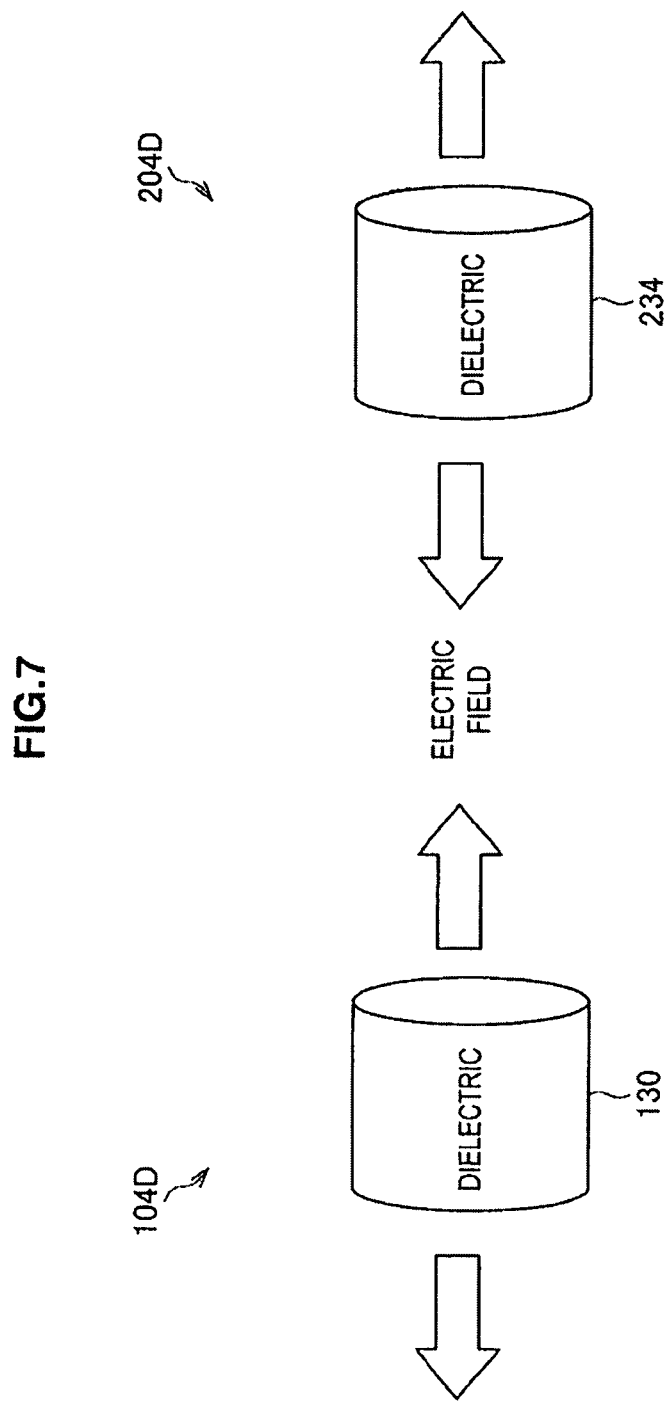
FIG. 7 is an explanatory view describing a fourth power transmitting means according to the embodiment of the present invention.

[4] Fourth Transmitting Means: Transmission of Power Using Electric Field Resonance FIG. 7 is an explanatory view describing the fourth power transmitting means according to the embodiment of the present invention. FIG. 7 shows a configuration example of a power transmission unit 104D of the power transmitting apparatus 100 and a power reception unit 204D of the power receiving apparatus 200, which perform reception of power using electric field resonance.

Similar to the third transmitting means, the fourth transmitting means is a transmitting means that uses the principle of resonance that when two transducers having unique number of vibrations (dielectric 130 and dielectric 234 in FIG. 7) are lined, the vibration applied to one dielectric is also transmitted to the other dielectric. Therefore, the transmission efficiency can be optimized by selecting the respective dielectric such that the resonance frequency at the dielectric 130 of the power transmission unit 104D and the resonance frequency at the dielectric 234 of the power reception unit 204D become equal. Through the use of the principle of resonance described above, the power receiving apparatus 200 applied with the fourth transmitting means can obtain power from the power transmitting apparatus 100, similar to the power receiving apparatus 200 applied with the third transmitting means.

In the power transmission system 1000 according to the embodiment of the present invention, power is transmitted from the power transmitting apparatus 100 to the power receiving apparatus 200 using the first to the fourth transmitting means described in [1] to [4]. It should be noted that the power transmitting means in the power transmission system 1000 according to the embodiment of the present invention is not limited to the first to the fourth transmitting means.

The configuration of the power transmitting apparatus 100 and the power receiving apparatus 200 configuring the power transmission system 1000 will be described by again referencing FIG. 3.

[Power Transmitting Apparatus 100]

First, the power transmitting apparatus 100 will be described. The power transmitting apparatus 100 includes a communication unit 102 (power transmission side communication unit), the power transmission unit 104, a control unit 106, a storage unit 108, an operation unit 110, and a display unit 112.

The power transmitting apparatus 100 may include a ROM (Read Only Memory; not shown) recorded with programs and control data such as calculation parameter used by the control unit 106; a RAM (Random Access Memory; not shown) for primary storing programs and the like executed by the control unit 106; and the like. The power transmitting apparatus 100 connects each component by a bus serving as a transmission path of data.

[Hardware Configuration Example of Power Transmitting Apparatus 100]

Figure 8:
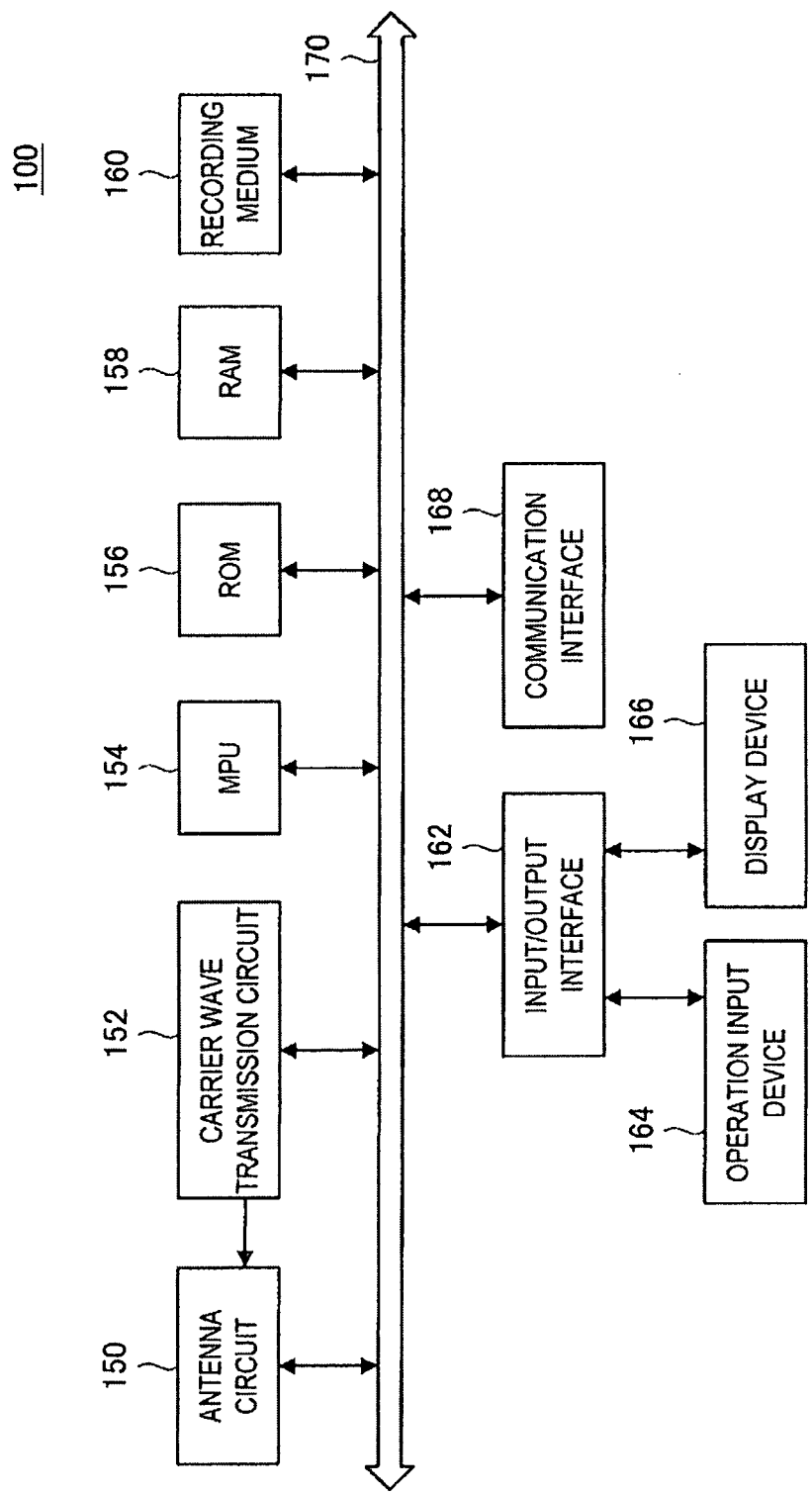
FIG. 8 is an explanatory view showing one example of a hardware configuration of the power transmitting apparatus according to the embodiment of the present invention.

FIG. 8 is an explanatory view showing one example of a hardware configuration of the power transmitting apparatus 100 according to the embodiment of the present invention. With reference to FIG. 8, the power transmitting apparatus 100 includes an antenna circuit 150, a carrier wave transmission circuit 152, an MPU 154, a ROM 156, a RAM 158, a recording medium 160, an input/output interface 162, an operation input device 164, a display device 166, and a communication interface 168. The power transmitting apparatus 100 connects each component by a bus 170 serving as a transmission path of data and the like.

The antenna circuit 150 and the carrier wave transmission circuit 152 function as the power transmission 104 in the power transmitting apparatus 100. Thus, the antenna circuit 150 and the carrier wave transmission circuit 152 may adopt the configurations corresponding to FIGS. 4 to 7 to realize the first to the fourth power transmitting means. For instance, the antenna circuit 150 is configured by a resonance circuit including a coil having a predetermined inductance and a capacitor having a predetermined electrostatic capacity serving as a transmission/reception antenna, but is not limited thereto. The carrier wave transmission circuit 152 is configured by an AC power supply, an amplification circuit for amplifying the output of the AC power supply, and the like.

The MPU 154 functions as the control unit 106 for controlling the entire power transmitting apparatus 100. The MPU 154 may also serve as the communication control unit 120, a transmission power information deriving unit 122, a transmission power determining unit 124, and a power transmission control unit 126, to be hereinafter described, in the power transmitting apparatus 100.

The ROM 156 stores the programs and the control data such as the calculation parameter used by the MPU 154, and the RAM 158 primary stores the programs, and the like executed by the MPU 154.

The recording medium 160 functions as the storage unit 108, and stores information (hereinafter described) related to power transmission for every power receiving apparatus used in the determination of the power to transmit to each power receiving apparatus, the application, and the like. The recording medium 160 may be a magnetic recording medium such as hard disk, or a non-volatile memory such as EEPROM (Electrically Erasable and Programmable Read Only Memory), flash memory, MRAM (Magnetoresistive Random Access Memory), FeRAM (Ferroelectric Random Access Memory), and PRAM (Phase change Random Access Memory), but is not limited thereto.

The input/output interface 162 connects the operation input device 164 and the display device 166. The operation input device 164 functions as the operation unit 110, and the display device 166 functions as the display unit 112. The input/output interface 162 may be a USB (Universal Serial Bus) terminal, DVI (Digital Visual Interface) terminal, HDMI (High-Definition Multimedia Interface) terminal, and the like, but is not limited thereto. The operation input device 164 may be a button, a direction key, a rotary selector such as a jog dial, or a combination thereof, and is arranged on the power transmitting apparatus 100 and connected to the input/output interface 162 at the interior of the power transmitting apparatus 100. The display device 166 may be an LCD (Liquid Crystal Display), organic EL (Electro Luminescence) display, or OLED display (Organic Light Emitting Diode display), and the like, and is arranged on the power transmitting apparatus 100 and connected to the input/output interface 162 at the interior of the power transmitting apparatus 100. It should be recognized that the input/output interface 162 can be connected to an operation input device (e.g., keyboard and mouse) and a display device (e.g, external display) serving as an external device of the power transmitting apparatus 100.

The communication interface 168 is a communication means arranged in the power transmitting apparatus 100, and function as a communication unit 102 for wireless/wire communicating with the external device such as the power receiving apparatus 200. The communication interface 168 here may be communication antenna and RF circuit (wireless communication), IEEE 802.15.1 port and transmission/reception circuit (wireless communication), IEEE 802.11b port and transmission/reception circuit (wireless communication), LAN terminal and transmission/reception circuit (wire communication), or the like, but is not limited thereto.

The power transmitting apparatus 100 configures the power transmission system 1000 capable of realizing the power transmission method according to the embodiment of the present invention shown in FIG. 2 by the hardware configuration shown in FIG. 8.

The configuration of the power transmitting apparatus 100 will be described with reference again to FIG. 3. The communication unit 102 is a communication means arranged in the power transmitting apparatus 100, and has a role of wire/wireless communicating with the external device such as the power receiving apparatus 200. The communication unit 102 may perform wireless communication with the external device such as the power receiving apparatus 200 using light, electric wave, or sound wave, but is not limited thereto. The communication unit 102 has its communication controlled by a communication control unit 120 arranged in the control unit 106.

The power transmission unit 104 is a power transmitting means arranged in the power transmitting apparatus 100, and has a role of transmitting power in a non-contact manner (wireless) to the external device such as the power receiving apparatus 200. The power transmission unit 104 can transmit power to the external device using electromagnetic induction (first transmitting means), electric wave (second transmitting means), and electric field or magnetic field resonance (third transmitting means, fourth transmitting means), but is not limited thereto. The power transmission unit 104 has its transmission of power controlled by a power transmission control unit 126 arranged in the control unit 106.

The control unit 106 is configured by MPU and the like, and has a role of controlling the entire power transmitting apparatus 100. The control unit 106 includes the communication control unit 120, the transmission power information deriving unit 122, the transmission power determining unit 124, and the power transmission control unit 126.

The communication control unit 120 has a role of controlling the communication unit 102. The communication control unit 120 transmits "start notification" to start deriving the coupling coefficient κ (start notification to start transmission of first transmission power)" (hereinafter sometimes simply referred to as "start notification") to the power receiving apparatus 200 via the communication unit 102. When the communication unit 102 receives various information transmitted from the power receiving apparatus 200, the communication control unit 120 transmits the relevant information to each unit that uses the information according to the type of information. For instance, when the communication unit 102 receives the first power consumption information Prcv and the second power consumption information Prcv0, the communication control unit 120 transmits the first power consumption information Prcv to the transmission power information deriving unit 122, or transmits the second power consumption information Prcv0 to the transmission power determining unit 124. When the communication unit 102 receives the received power information, the communication control unit 120 transmits the relevant received power information or the information that the received power information is received to the transmission power information deriving unit 122. The communication control unit 120 is not limited to transmitting various information received by the communication unit 102 to each unit and may record the information in the storage unit 108.

The transmission power information deriving unit 122 has a role of deriving information related to power transmission for determining the second transmission power. More specifically, the transmission power information deriving unit 122 transmits the first transmission power Ptrans(k) for deriving the information related to power transmission from the power transmission unit 104. The transmission power information deriving unit 122 transmits the first transmission power Ptrans(k) that increases discretely from the initial value (e.g., k=0) to the maximum value. For instance, the transmission power information deriving unit 122 can transmit a discrete first transmission power Ptrans(k) using a look up table in which the value of k and the value of the first transmission power Ptrans(k) are corresponded, but is not limited thereto. The information such as the look up table used by the transmission power information deriving unit 122 to transmit the first transmission power Ptrans(k) may be stored in a storing means (e.g., non-volatile memory such as EEPROM and flash memory) arranged in the transmission power information deriving unit 122, but is not limited thereto, and may be stored in the storage unit 108 of the power transmitting apparatus 100.

The transmission power information deriving unit 122 derives the information related to power transmission based on the first power consumption information Prcv acquired from the power receiving apparatus 200 and the first transmission power Ptrans(k) of when receiving the received power information. The transmission power information deriving unit 122 can derive the coupling coefficient κ serving as the information related to power transmission by using Formula 1, but it not limited thereto. For instance, the transmission power information deriving unit 122 can uniquely derive the coupling coefficient κ serving as the information related to power transmission using the look up table in which the first power consumption information Prcv, the first transmission power Ptrans(k), and the coupling coefficient κ are corresponded.

Furthermore, the transmission power information deriving unit 122 can record the derived information related to power transmission in the storage unit 108. The transmission power information deriving unit 122 may cause the power transmission control unit 126 to transmit the first transmission power Ptrans(k) by issuing a transmission command to the power transmission control unit 126.

The transmission power determining unit 124 has a role of determining the second transmission power Ptrans0. The transmission power determining unit 124 can derive the second transmission power Ptrans0 based on the second power consumption information Prcv0 acquired from the power receiving apparatus 200 and the coupling coefficient (information related to power transmission) derived by the transmission power information deriving unit 122, as shown in Formula 2.

The power transmission control unit 126 has a role of controlling the power transmission unit 104. The power transmission control unit 126 causes the power transmission unit 104 to transmit the power based on the second transmission power PTrans0 determined by the transmission power determining unit 124. The power transmission control unit 126 may also cause the power transmission unit 104 to transmit the first transmission power Ptrans(k), in which the power to transmit increases discretely, based on the transmission instruction from the transmission power information deriving unit 122.

The control unit 106 can perform communication control and power transmission control with the power receiving apparatus 200 by including the communication control unit 120, the transmission power information deriving unit 122, the transmission power determining unit 124, and the power transmission control unit 126.

The storage unit 108 is a storing means arranged in the power transmitting apparatus 100. The storage unit 108 stores information (e.g., coupling coefficient κ) related to power transmission derived with respect to each power receiving apparatus, as well as, the first power consumption power information Prcv and the second power consumption information Prcv0 transmitted from each power receiving apparatus, various applications, and the like.

The storage unit 108 may be a magnetic recording medium such as hard disc, a non-volatile memory such as flash memory, and the like, but is not limited thereto.

The operation unit 110 is an operating means of the power transmitting apparatus 100 enabling the user to perform a predetermined operation. The power transmitting apparatus 100 can transmit, for example, the "start notification" to the control unit 106 (more specifically, communication control unit 120) or the power transmitting apparatus 100 can perform the operation desired by the user arranging the operation unit 110. The operation unit 110 may be an operation input device such as keyboard and mouse, button, direction key, rotary selector such as jog dial, or a combination thereof, but is not limited thereto.

The display unit 112 is a displaying means arranged in the power transmitting apparatus 100 and displays various information on the display screen. The screen displayed on the display screen of the display unit 112 may be an operation screen for causing the power transmitting apparatus 100 to perform the desired operation, a screen showing the state of communication, state of power transmission, and the like with the power receiving apparatus 200, but is not limited thereto. The display unit 112 may be an LCD, an organic EL display, and the like, but is not limited thereto.

According to the above configuration, the power transmitting apparatus 100 can transmit to the power receiving apparatus 200 the power (second transmission power Ptrans0 derived from the information related to power transmission) based on the state related to transmission of power between the power transmitting apparatus 100 and the power receiving apparatus 200. The power transmission method in the power transmitting apparatus 100 will bow be specifically described.

[Power Transmission Method in Power Transmitting Apparatus 100]

Figure 9:
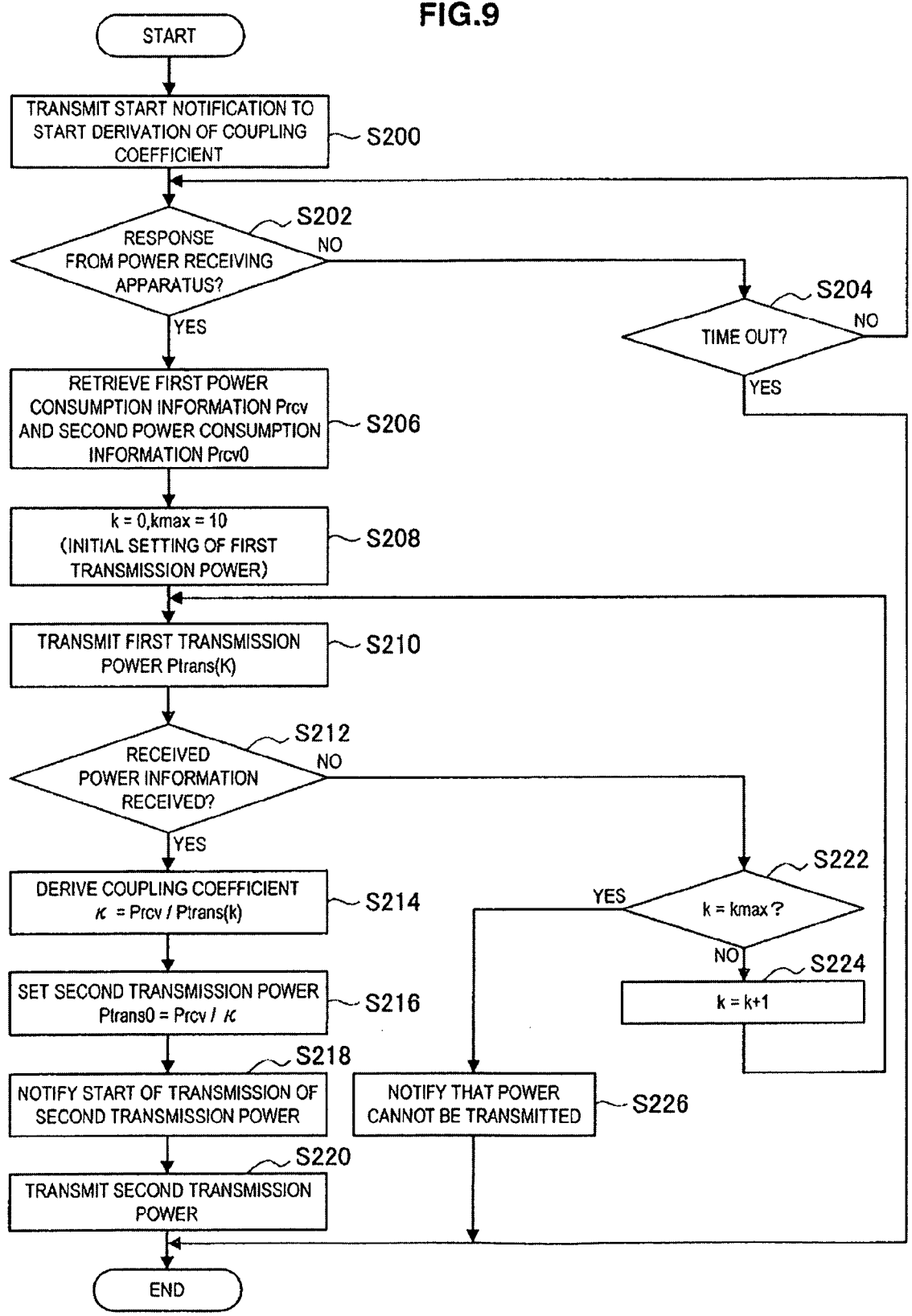
FIG. 9 is a flowchart showing one example of the power transmission method in the power transmitting apparatus according to the embodiment of the present invention.

FIG. 9 is a flowchart showing one example of the power transmission method in the power transmitting apparatus 100 according to the embodiment of the present invention. FIG. 9 shows a case where the power transmitting apparatus 100 derives the coupling coefficient κ as information related to power transmission.

The power transmitting apparatus 100 transmits a start notification to start deriving the coupling coefficient κ (start notification to start transmission of the first transmission power) to the power receiving apparatus 200 (S200).

When the start notification is transmitted in step S200, the power transmitting apparatus 100 determines whether or not a response from the power receiving apparatus 200 is received (S202). The power transmitting apparatus 100 can perform the determination of step S202 depending on whether or not the first power consumption information Prcv and the second power consumption information Prcv0 are received, but is not limited thereto.

If determined that the response from the power receiving apparatus 200 is not received in step S202, the power transmitting apparatus 100 determines whether or not a predetermined time has elapsed (time out) (S204). If determined that the predetermined time has not elapsed in step S204, the power transmitting apparatus 100 repeats the processes from step S202. If determined that the predetermined time has elapsed in step S204, the power transmitting apparatus 100 terminates the power transmission process.

If determined that the response from the power receiving apparatus 200 is received in step S202, the power transmitting apparatus 100 retrieves the received first power consumption information Prcv and the second power consumption information Prcv0 (S206). Here, the power transmitting apparatus 100 transmits the first power consumption information Prcv to the transmission power information deriving unit 122, and transmits the second power consumption information Prcv0 to the transmission power determining unit 124 to perform the process of step S206.

After retrieving the first power consumption information Prcv and the second power consumption information Prcv0 in step S206, the power transmitting apparatus 100 performs an initial setting of the first transmission power Ptrans (k) (S208). In FIG. 9, an example where the power transmitting apparatus 100 sets the value of k corresponding to the initial value of the first transmission power Ptrans(k) to k=0, and sets the value of kmax corresponding to the maximum value of the first transmission power Ptrans(k) to kmax=10 is shown.

In FIG. 9, a case where the process of step S208 is performed after the process of step S206 is shown, but the process of step S206 and the process of step S208 may be independently performed. Therefore, the power transmitting apparatus 100 can perform the process of step S206 after the process of step S208, or can perform the process of step S206 and the process of step S208 in synchronization.

After the initial setting of the first transmission power Ptrans(k) is performed in step S208, the power transmitting apparatus 100 transmits the first transmission power Ptrans (k) (S210). The power transmitting apparatus 100 can uniquely transmit the first transmission power Ptrans(k) corresponding to the value of k by using the look up table in which the value of k and the value of the first transmission power Ptrans(k) are corresponded.

The power transmitting apparatus 100 that transmitted the first transmission power Ptrans(k) in step S210 determines whether or not the received power information is received (S212). The power transmitting apparatus 100 may be provided with a predetermined standby time for the determination of step S212.

If determined that the received power information is not received in step S212, the power transmitting apparatus 100 determines whether or not the value of k is a maximum value (S222). If determined that the value of k is the maximum value in step S222, the power transmitting apparatus 100 transmits the notification that power may not be transmitted to the power receiving apparatus 200 (S226), and terminates the power transmission process. If determined that the value of k is not the maximum value in step S222, the power transmitting apparatus 100 adds one to the value of k (S224), and repeats the processes from step S210.

If determined that the received power information is received in step S212, the power transmitting apparatus 100 derives the coupling coefficient κ (one example of information related to power transmission) (S214). The power transmitting apparatus 100 can derive the coupling coefficient κ by using Formula 1, but is not limited thereto.

When the coupling coefficient κ is derived in step S214, the power transmitting apparatus 100 sets the second transmission power Ptrans0 (S216). The power transmitting apparatus 100 can set the second transmission power Ptrans0 by deriving the second transmission power Ptrans0 using Formula 2.

After the second transmission power Ptrans0 is set in step S216, the power transmitting apparatus 100 notifies the transmission of the second transmission power Ptrans0 to the power receiving apparatus 200 (S218). The power transmitting apparatus 100 then transmits the second transmission power Ptrans0 (S220).

The power transmitting apparatus 100 can transmit the power (second transmission power Ptrans0 derived from the information related to power transmission) based on the state related to transmission of power between the power transmitting apparatus 100 and the power receiving apparatus 200 to the power receiving apparatus 200 using the power transmission method shown in FIG. 9.

The power transmitting apparatus 100 sets the second transmission power Ptrans0 according to the reception of the received power information transmitted from the power receiving apparatus 200. Therefore, the power transmitting apparatus 100 may not transmit power to the power receiving apparatus 200 if the received power information is not received, that is, if the power (second transmission power Ptrans0) suited to the state related to transmission of power may not be transmitted by using the power transmission method shown in FIG. 9.

The power transmitting apparatus 100 may use the power transmission method shown in FIG. 9 for every transmission of power, but is not limited thereto. For instance, the power transmitting apparatus 100 may record the coupling coefficient κ (one example of information related to power transmission) derived in step S214 in the storage unit 108, and set the second transmission power Ptrans0 using the coupling coefficient κ stored in the storage unit 108. In the above case, the power transmitting apparatus 100 uses the power transmission method shown in FIG. 9 on a regular basis/on an irregular basis to transmit to the power receiving apparatus 200 the power (second transmission power Ptrans0 derived from the information related to power transmission) complying with the state related to transmission of power between the power transmitting apparatus 100 and the power receiving apparatus 200.

[Power Receiving Apparatus 200]

The power receiving apparatus 200 will now be described. The power receiving apparatus 200 includes a communication unit 202 (power reception side communication unit) the power reception unit 204, a transformer/regulator 206, a power supply unit 208, a load circuit 210, a received power level detection unit 212, a switching unit 214, a control unit 216, a storage unit 218, an operation unit 220, and a display unit 222.

The power receiving apparatus 200 may include a ROM (not shown) recorded with programs and control data such as calculation parameter used by the control unit 216; a RAM (not shown) for primary storing programs and the like executed by the control unit 216; and the like. The power receiving apparatus 200 connects each components by a bus serving as a data transmission path.

[Hardware Configuration Example of Power Receiving Apparatus 200]

Figure 10:
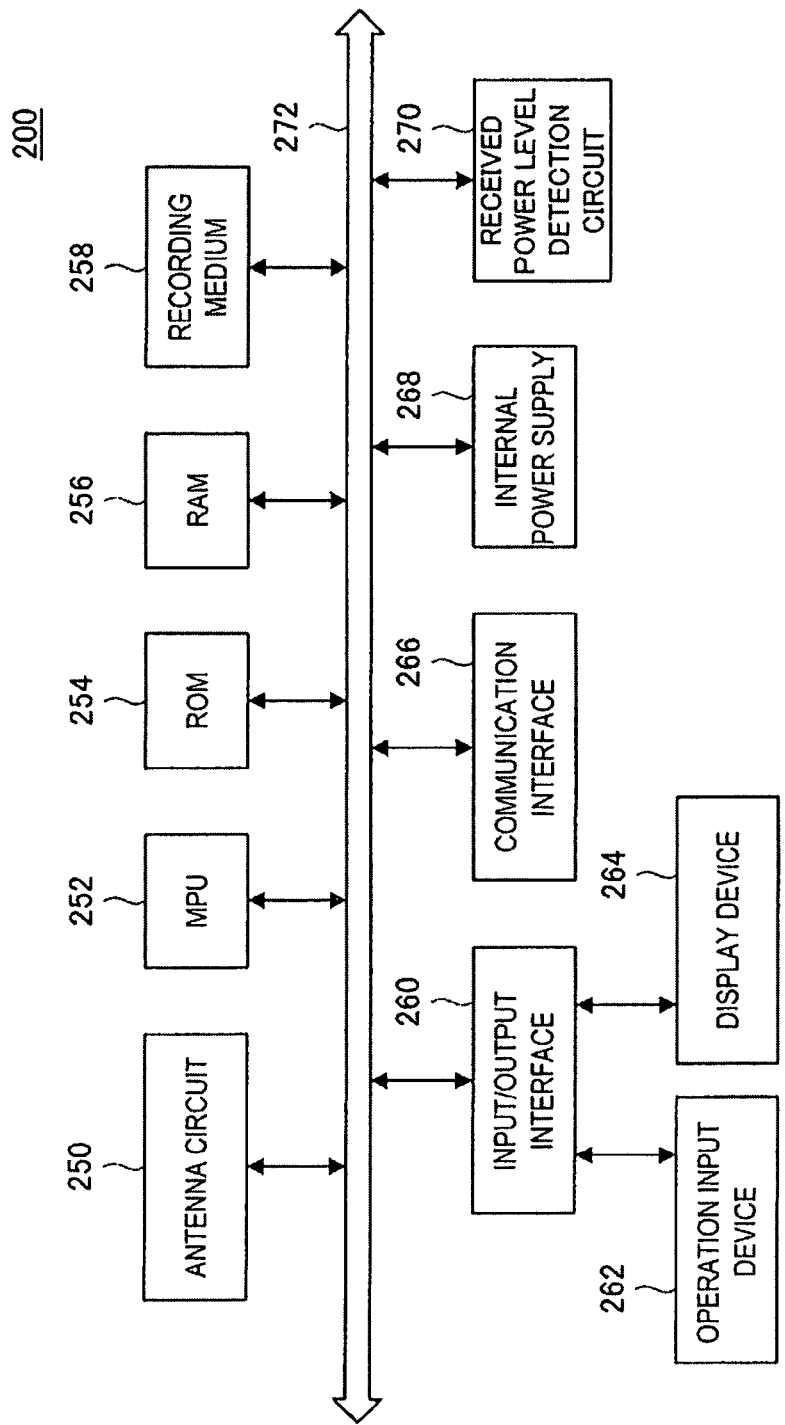
FIG. 10 is an explanatory view showing one example of a hardware configuration of the power receiving apparatus according to the embodiment of the present invention.

FIG. 10 is an explanatory view showing one example of a hardware configuration of the power receiving apparatus 200 according to the embodiment of the present invention. With reference to FIG. 10, the power receiving apparatus 200 includes an antenna circuit 250, an MPU 252, a ROM 254, a RAM 256, a recording medium 258, an input/output interface 260, an operation input device 262, a display device 264, a communication interface 266, an internal power supply 268, and a received power level detection circuit 270. The power receiving apparatus 200 connects each component by a bus 272 serving as a transmission path of data and the like.

The antenna circuit 250 functions as the power transmission 204 in the power receiving apparatus 200. Thus, the antenna circuit 250 may adopt the configurations corresponding to FIGS. 4 to 7 in correspondence to the power transmitting means in the power transmission unit 104 arranged in the power transmitting apparatus 100.

The MPU 252 functions as the control unit 206 for controlling the entire power receiving apparatus 200. The ROM 254 stores the programs and the control data such as the calculation parameter used by the MPU 252, and the RAM 256 primary stores the programs, and the like executed by the MPU 252.

The recording medium 258 functions as the storage unit 218, and stores the first power consumption information Prcv, the second power consumption information Prcv0, the application, and the like. The recording medium 258 may be a magnetic recording medium such as hard disc, or a non-volatile memory such as EEPROM, flash memory, MRAM, FeRAM, and PRAM, but is not limited thereto.

The input/output interface 260 connects the operation input device 262 and the display device 264. The operation input device 262 functions as the operation unit 220, and the display device 264 functions as the display unit 222. The input/output interface 260 may be a USB terminal, DVI terminal, HDMI terminal, and the like, but is not limited thereto.

The operation input device 262 may be a button, a direction key, a rotary selector such as a jog dial, or a combination thereof, and is arranged on the power receiving apparatus 200 and connected to the input/output interface 260 at the interior of the power receiving apparatus 200. The display device 264 may be an LCD, organic EL display, and the like, and is arranged on the power receiving apparatus 200 and connected to the input/output interface 260 at the interior of the power receiving apparatus 200. It should be recognized that the input/output interface 260 can be connected to an operation input device (e.g., keyboard and mouse) serving as an external device of the power receiving apparatus 200, and a display device (e.g, external display).

The communication interface 266 is a communication means arranged in the power receiving apparatus 200, and function as a communication unit 202 for wireless/wire communicating with the external device such as the power transmitting apparatus 100. The communication interface 266 here may be a communication antenna and RF circuit (wireless communication), IEEE 802.15.1 port and transmission/reception circuit (wireless communication), IEEE 802.11b port and transmission/reception circuit (wireless communication), LAN terminal and transmission/reception circuit (wire communication), or the like, but is not limited thereto.

The internal power supply 268 is a power supply arranged in the power receiving apparatus 200 that stores the received power, and supplies the drive voltage for driving each unit of the power receiving apparatus 200. The internal power supply 268 may be a rechargeable battery such as lithium-ion rechargeable battery, but is not limited thereto.

The received power level detection circuit 270 functions as the received power level detection unit 212, and outputs the detection result corresponding to the received power level of the received first transmission power Ptrans(k).

<Example of Received Power Level Detection Circuit 270>

(1) First Example

Figure 11:
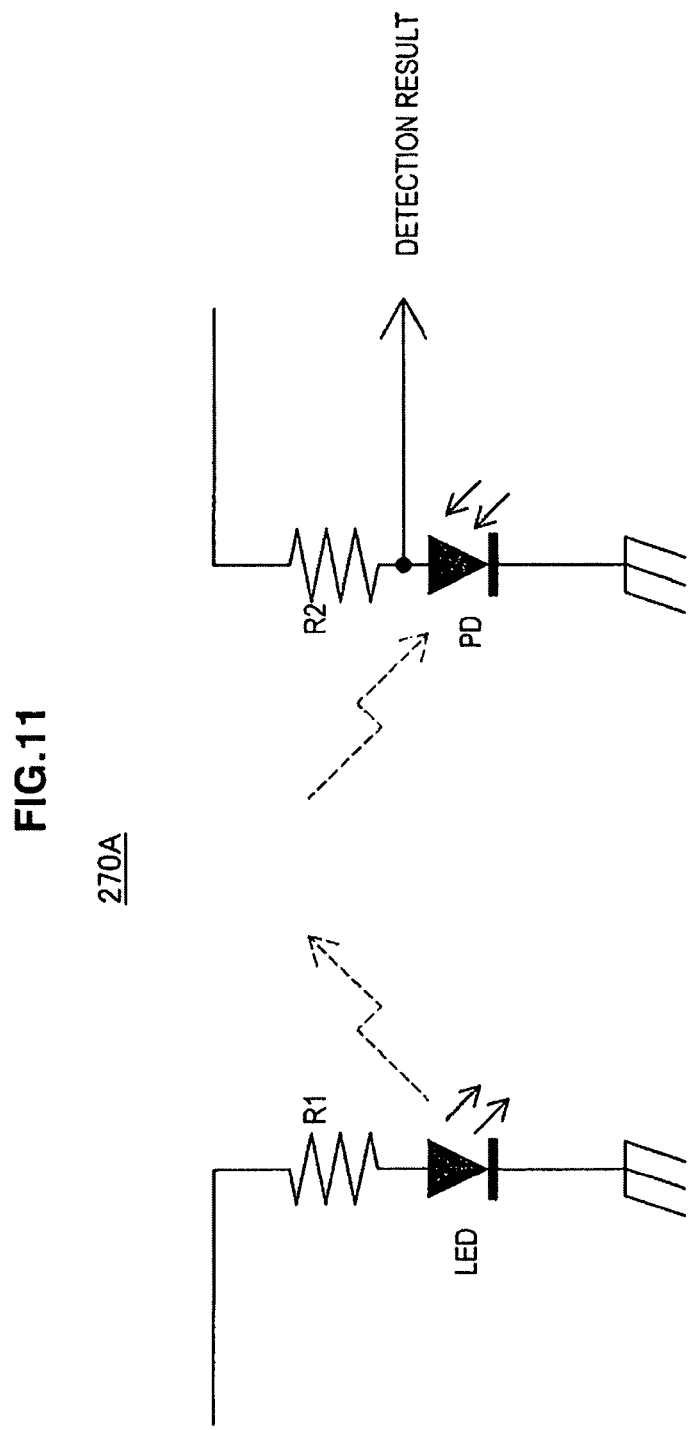
FIG. 11 is an explanatory view showing a first example of the received power level detection circuit according to the embodiment of the present invention.

FIG. 11 is an explanatory view showing a first example of the received power level detection circuit 270 according to the embodiment of the present invention. With reference to FIG. 11, a received power level detection circuit 270A according to the first example includes a resistor R1, a light emission diode LED, a photodiode PD, and a resistor R2. When the load current corresponding to the first transmission power Ptrans(k) flows to the light emission diode LED, the light emission diode LED emits light at a light emission amount corresponding to such load current. The photodiode PD acts as a so-called photodetector, and detects the light generated by the light emission diode LED. The photodiode PD outputs the current corresponding to the detection amount. The received power level detection circuit 270A outputs the detection result corresponding to the received power level of the received first transmission power Ptrans(k) by outputting the current corresponding to the detection amount as detection result.

The resistor R1 and the light emission diode LED shown in FIG. 11 correspond to a measurement load circuit for deriving the information related to power transmission. The photodiode PD and the resistor R2 shown in FIG. 11 correspond to a detection circuit. In FIG. 11, the received power level detection circuit 270A includes the photodiode PD, but is not limited thereto. The received power level detection circuit according to the embodiment of the present invention may be configured using various photodetectors such as photoresistor.

(2) Second Example

Figure 12:
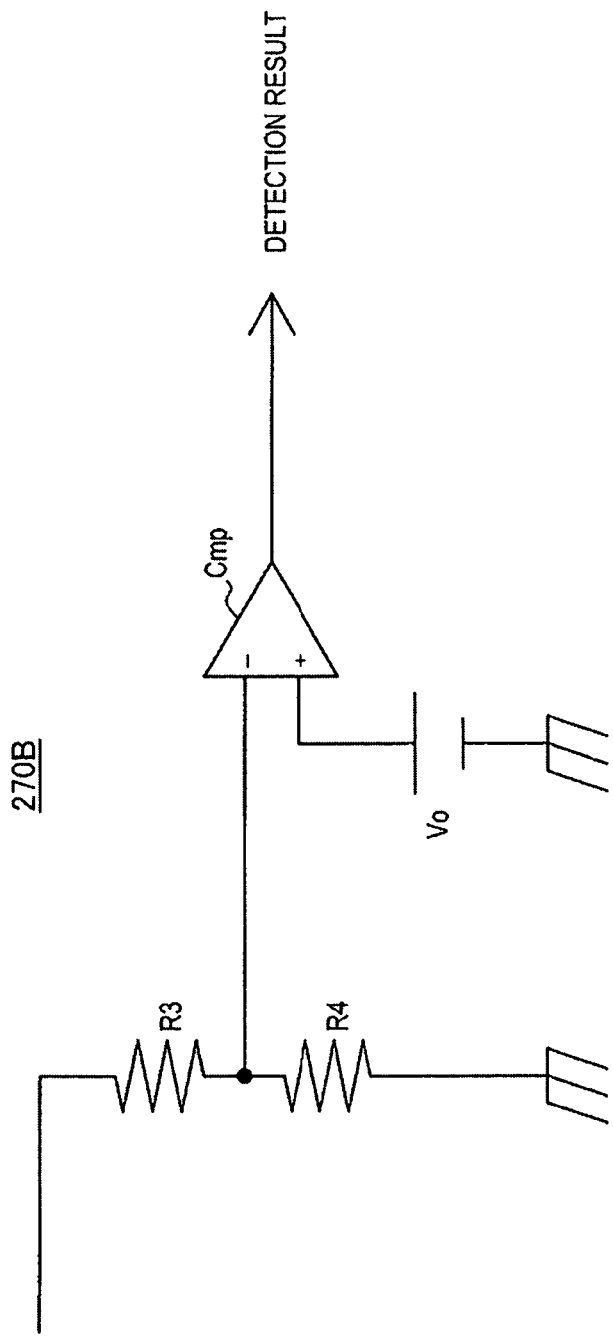
FIG. 12 is an explanatory view showing a second example of the received power level detection circuit according to the embodiment of the present invention.

FIG. 12 is an explanatory view showing a second example of a received power level detection circuit 270 according to the embodiment of the present invention. With reference to FIG. 12, a received power level detection circuit 270B according to the second example includes a resistor R3, a resistor R4, and a comparator Cmp. The resistor R3 and the resistor R4 voltage divides the voltage corresponding to the first transmission power Ptrans(k), and the comparator Cmp compares the voltage divided voltage and a reference voltage V0. The comparator Cmp outputs the voltage corresponding to the comparison result as detection result. Therefore, the received power level detection circuit 270B outputs the detection result indicating whether or not the received power level of the received first transmission power Ptrans(k) meets a predetermined level.

The resistor R3 and the resistor R4 shown in FIG. 12 correspond to the measurement load circuit for deriving the information related to power transmission. The comparator Cmp shown in FIG. 12 corresponds to the detection circuit.

(2) Third Example

Figure 13:
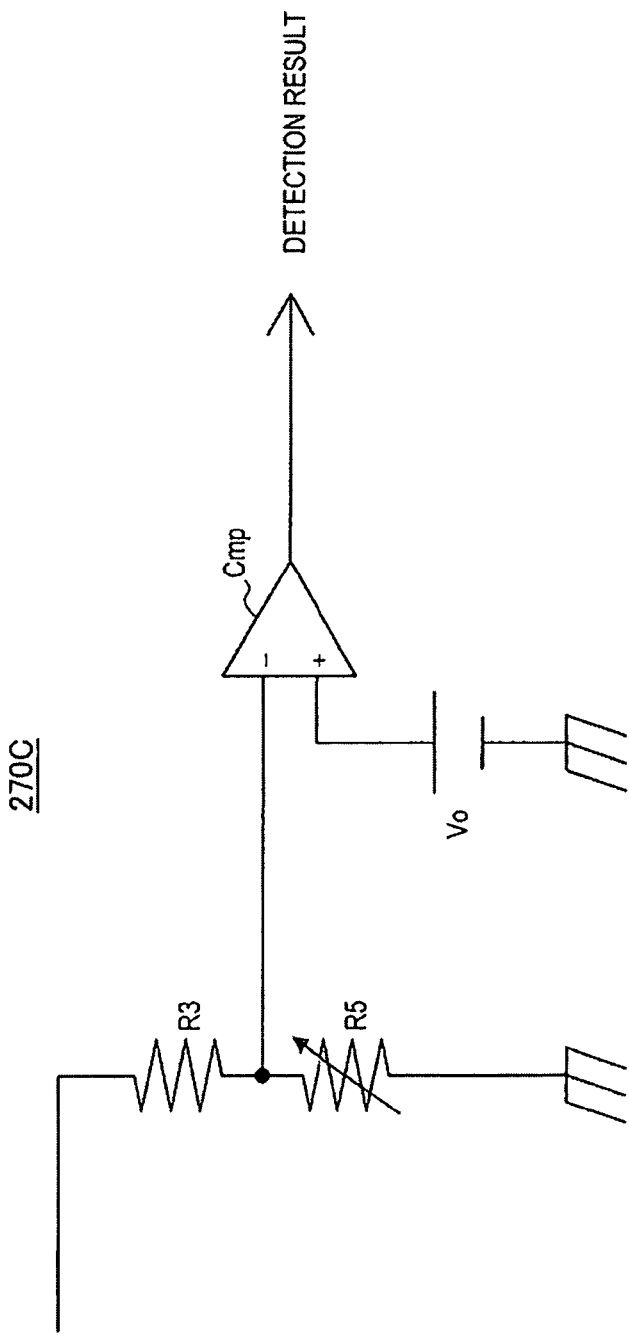
FIG. 13 is an explanatory view showing a third example of the received power level detection circuit according to the embodiment of the present invention.

FIG. 13 is an explanatory view showing a third example of the received power level detection circuit 270 according to the embodiment of the present invention. With reference to FIG. 13, a received power level detection circuit 270C according to the third example basically has the same configuration as the received power level detection circuit 270B shown in FIG. 12, but includes a variable resistor R5 in place of the resistor R4 shown in FIG. 12. Since the received power level detection circuit 270C basically has the same configuration as the received power level detection circuit 270B shown in FIG. 12, the detection result indicating whether or not the received power level of the received first transmission power Ptrans(k) meets a predetermined level can be output. The received power level detection circuit 270C can also change the voltage dividing ratio at which the voltage corresponding to the first transmission power Ptrans(k) is divided since the variable resistor R5, which resistance value changes, is arranged. That is, the received power level detection circuit 270C can vary the predetermined level indicated by the detection result.

If the power receiving apparatus 200 sets the resistance value of the variable resistor R5 of the received power level detection circuit 270C such that the predetermined level indicated by the detection result becomes higher, the first transmission power Ptrans(k) corresponding to the received power information to be transmitted becomes larger. Conversely, if the power receiving apparatus 200 sets the resistance value of the variable resistor R5 of the received power level detection circuit 270C such that the predetermined level indicated by the detection result becomes lower, the first transmission power Ptrans(k) corresponding to the received power information to be transmitted becomes smaller. The power transmitting apparatus 100 derives the information (e.g., coupling coefficient κ) related to power transmission based on the first transmission power Ptrans(k) corresponding to the received power information, as described above, and sets the second transmission power Ptrans0 based on the information related to power transmission. Therefore, the power receiving apparatus 200 can set discretely the predetermined level indicated by the detection result by arranging the received power level detection circuit 270C, whereby the predetermined level can be set to a level more suited to the second power consumption information Prcv0. The power transmitting apparatus 100 can transmit the second transmission power Ptrans0 complying with the state related to transmission of power between the power transmitting apparatus 100 and the power receiving apparatus 200 by having the power receiving apparatus 200 set the predetermined level indicated by the detection result to a level more suited to the second power consumption information Prcv0.

(4) Fourth Example

Figure 14:
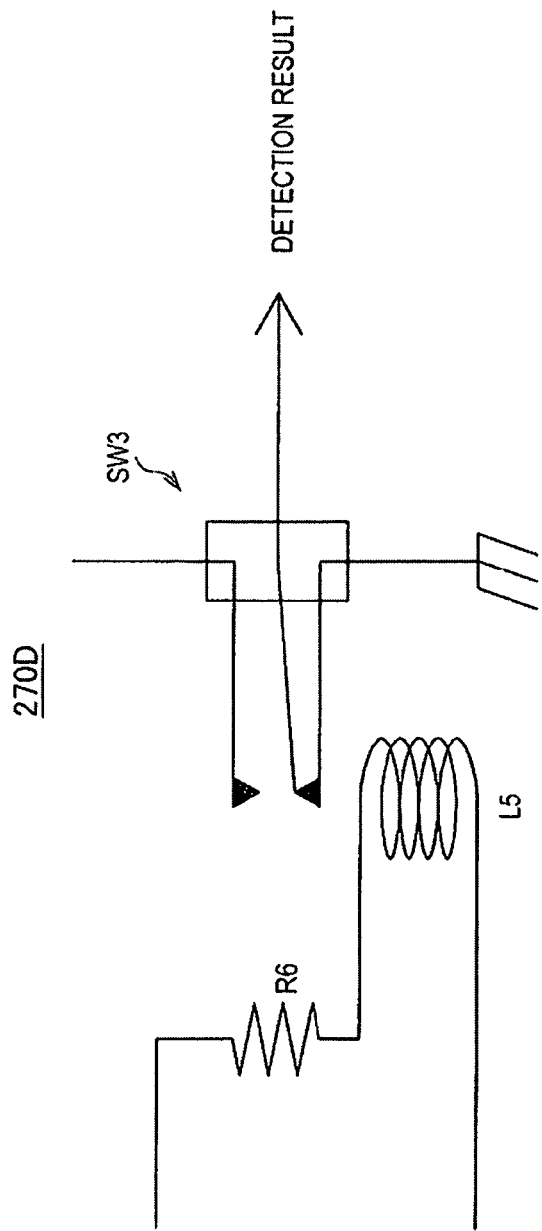
FIG. 14 is an explanatory view showing a fourth example of the received power level detection circuit according to the embodiment of the present invention.

FIG. 14 is an explanatory view showing a fourth example of the received power level detection circuit 270 according to the embodiment of the present invention. With reference to FIG. 14, a received power level detection circuit 270D according to the fourth example includes a resistor R6, an inductor L5, and a switch SW3, and configures an electromagnetic relay switch. When the load current corresponding to the first transmission power Ptrans(k) flows to the inductor L5, the magnetic field according to the load current generates. As the switch SW3 performs the switching operation according to the intensity of the magnetic field based on the load current, the detection result output from the received power level detection circuit 270D changes. Therefore, the received power level detection circuit 270D can output the detection result corresponding to the received power level of the received first transmission power Ptrans(k).

The received power level detection circuit 270 can output the detection result corresponding to the received power level of the received first transmission power Ptrans(k) without measuring the received power value (or voltage value or current value) by adopting the configuration shown in FIGS. 11 to 14.

The power receiving apparatus 200 configures the power transmission system 1000 capable of realizing the power transmission method according to the embodiment of the present invention shown in FIG. 2 by the hardware configuration shown in FIG. 10.

The configuration of the power receiving apparatus 200 will be described with reference again to FIG. 3. The communication unit 202 is a communication means arranged in the power receiving apparatus 200, and has a role of wire/wireless communication with the external device such as the power transmitting apparatus 100. The communication unit 202 may adopt a configuration corresponding to the communication unit 102 of the power transmitting apparatus 100. Therefore, the communication unit 202 can receive the "start notification" transmitted from the power transmitting apparatus 100, and can transmit the "received power information" to the power transmitting apparatus 100. The communication unit 202 has its communication controlled by the control unit 216.

The power reception unit 204 is a power receiving means arranged in the power receiving apparatus 200, and has a role of receiving the power transmitted in a non-contact manner (wireless) from the power transmitting apparatus 100. The power reception unit 204 may adopt a configuration corresponding to the power transmission unit 104 of the power transmitting apparatus 100, to thereby receive power using electromagnetic induction (first transmitting means), electric wave (second transmitting means), and electric field or magnetic field resonance (third transmitting means, fourth transmitting means).

The transformer/regulator 206 performs transformation of voltage based on the power received by the power reception unit 204, smoothing of voltage after transformation, and constant voltage control. Here, if the received power level detection unit 212 is configured by the received power level detection circuit 270C shown in FIG. 13, the power receiving apparatus 200 can set discretely the predetermined level indicated by the detection result in a wider range in combination with the setting of the transformation ratio of the transformer of the transformer/regulator 206.

The power supply unit 208 is an internal power supply arranged in the power receiving apparatus 200 and stores the received power. The power supply unit 208 supplies the drive voltage for driving each unit of the power receiving apparatus 200. The internal power supply 208 may be a lithium-ion rechargeable battery, and the like.

The load circuit 210 corresponds to a processing circuit, which can be driven by directly using the received power, arranged in the power receiving apparatus 200. Although not shown in FIG. 3, the load circuit 210 can cause the communication unit 202 to transmit the processing result to the external device or transmit the processing result to the control unit 216.

The received power level detection unit 212 output s the detection result corresponding to the received power level of the received power by adopting the configuration shown in FIGS. 11 to 14. The power receiving apparatus 200 selectively inputs the first transmission power Ptrans(k) to the received power level detection unit 212 by controlling the switching unit 214. Therefore, the received power level detection unit 212 can output the detection result corresponding to the received power level of the received first transmission power Ptrans(k).

If the received power level detection unit 212 includes a light emitting element (e.g., light emission diode LED) as shown in FIG. 11, the received power level detection unit 212 may be configured to emit the light from the light emission of the light emitting element to the outside of the power receiving apparatus 200. If the received power level detection unit 212 has the above-described configuration, the power receiving apparatus 200 may further have a power reception notification function for notifying to the user whether or not the first transmission power Ptrans(k) is received.

The switching unit 214 includes a switch SW1 corresponding to the load circuit 210, and a switch SW2 corresponding to the received power level detection unit 212. The switching unit 214 connects either the load circuit 210 or the received power level detection unit 212 to the power reception unit 204 (more specifically, to the transformer/regulator 206) in response to the control signal transmitted from the control unit 216. For instance, the switching unit 214 connects the load circuit 210 to the power reception unit 204 if the control signal is not transmitted, and connects the received power level detection unit 212 to the power reception unit 204 if the control signal is transmitted. The switch SW1 and the switch SW2 may be configured as a MOSFET (Metal Oxide Semiconductor Field Effect Transistor) in which the conductivity-type differs from each other, but is not limited thereto. The control signal is transmitted from the control unit 216 when the communication unit 202 receives the "start notification".

The power receiving apparatus 200 can transition to the received power level detection mode as shown in step S102 of FIG. 2 by including the switching unit 214.

The control unit 216 is configured by MPU and the like, and has a role of controlling the entire power receiving apparatus 200 and a role of performing various processes. When the communication unit 202 receives the "start notification", the control unit 216 transmits the control signal to the switching unit 214. The control unit 216 then can control the power receiving apparatus 200 to transition (switch) from the normal operation mode (state capable of executing the function of the power receiving apparatus 200) to the received power level detection mode (state for detecting the received power level). When switching to the received power level detection mode, the control unit 216, for example, reads the first power consumption information Prcv and the second power consumption information Prcv0 from the storage unit 218, and transmits the first power consumption information Prcv and the second power consumption information Prcv0 from the communication unit 202 to the power transmitting apparatus 100.

Furthermore, the control unit 216 determines whether or not the received power level meets a predetermined level based on the detection result transmitted from the received power level detection unit 212. When determining that the received power level meets the predetermined level, the control unit 216 transmits "received power information" indicating that the received power level meets the predetermined level from the communication unit 202 to the power transmitting apparatus 100.

As described above, the control unit 216 serves as a communication control unit for controlling transmission and reception of various information transmitted and received with the power transmitting apparatus 100.

The storage unit 218 is a storing means arranged in the power receiving apparatus 200. The storage unit 218 stores first power consumption information Prcv, second power consumption information Prcv0, various applications, and the like.

The storage unit 218 may be a magnetic recording medium such as hard disc, a non-volatile memory such as flash memory, or the like, but is not limited thereto.

The operation unit 220 is an operating means of the power receiving apparatus 200 enabling the user to perform a predetermined operation. The user can perform the desired operation on the power receiving apparatus 200 by arranging the operation unit 220 in the power receiving apparatus 200. The operation unit 220 may be an operation input device such as keyboard and mouse, button, direction key, rotary selector such as jog dial, or a combination thereof, but is not limited thereto.

The display unit 222 is a displaying means arranged in the power receiving apparatus 200 and displays various information on the display screen. The screen displayed on the display screen of the display unit 222 may be an operation screen for performing the desired operation on the power receiving apparatus 200, a screen showing the state of communication, state of power transmission, and the like with the power transmitting apparatus 100, but is not limited thereto. The display unit 222 may be an LCD, an organic EL display, and the like, but is not limited thereto.

According to the above configuration, the power receiving apparatus 200 can detect the received power level of the first transmission power Ptrans(k), and transmit the received power information to the power transmitting apparatus 100 based on the detection result. As described above, the power transmitting apparatus 100 sets the second transmission power Ptrans0 in accordance with the reception of the received power information. Therefore, the power receiving apparatus 200 can receive from the power transmitting apparatus 100 the power (second transmission power Ptrans0 derived from the information related to power transmission) based on the state related to transmission of power between the power transmitting apparatus 100 and the power receiving apparatus 206. The method for transmitting the received power information in the power receiving apparatus 200 will now be specifically described.

[Method for Transmitting the Received Power Information in Power Receiving Apparatus 200]

Figure 15:
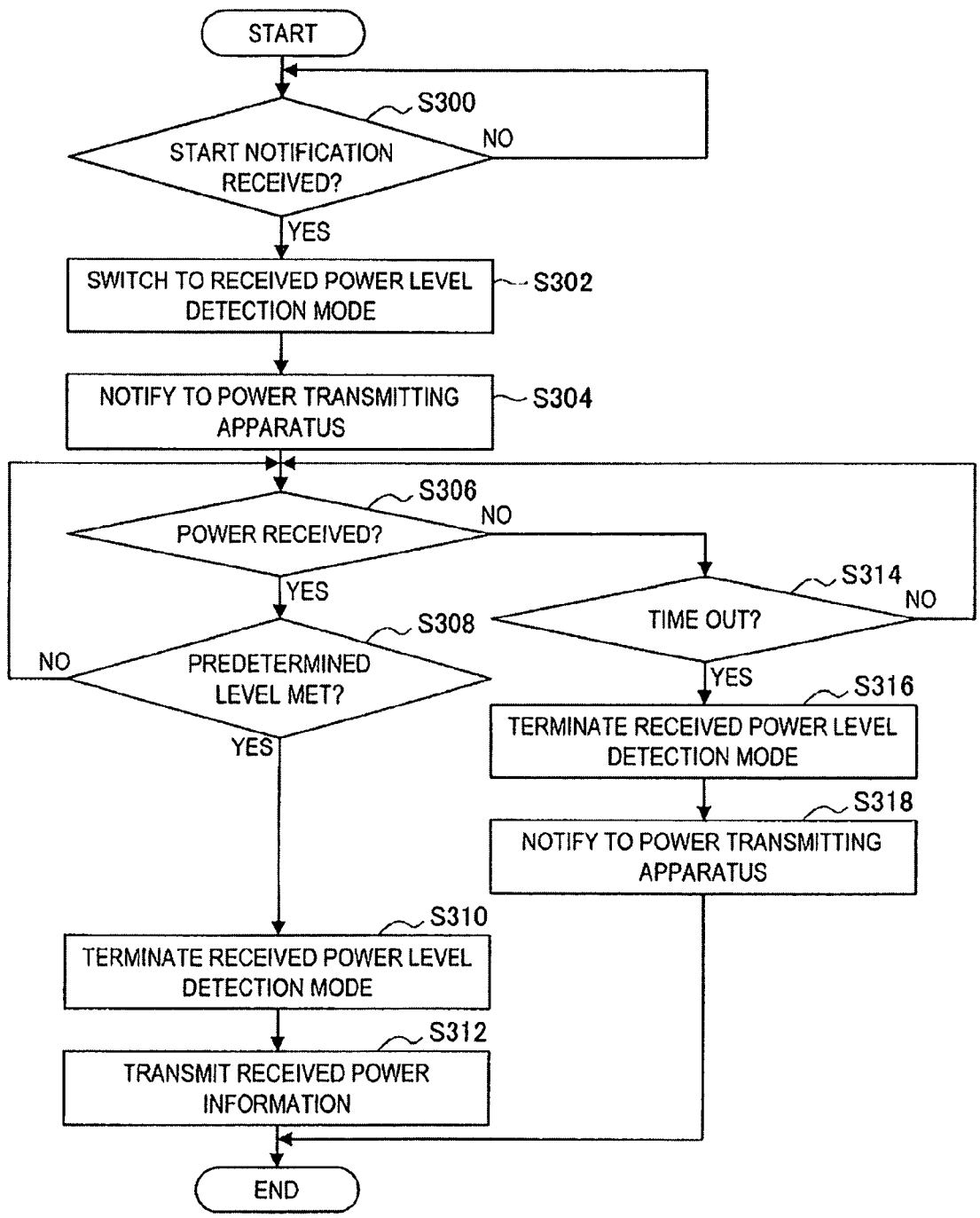
FIG. 15 is a flowchart showing one example of a method for transmitting the received power information in the power receiving apparatus according to the embodiment of the present invention.

FIG. 15 is a flowchart showing one example of the method for transmitting the received power information in the power receiving apparatus 200 according to the embodiment of the present invention.

The power receiving apparatus 200 determines whether or not the start notification is received (S300). If determined that the start notification is not received in step S300, the power receiving apparatus 200 may not proceed the process until determining that the start notification is received.

If determined that the start notification is received in step S300, the power receiving apparatus 200 switches to the received power level detection mode (S302: transmission process to received power level detection mode). The power receiving apparatus 200 can switch to the received power level detection mode by having the control unit 216 transmit the control signal to the switching unit 214, validating the received power level detection unit 212 (e.g., connect with power reception unit 204), and invalidating the load circuit 210 (e.g., disconnect with power reception unit 204).

After switching to the received power level detection mode in step S302, the power receiving apparatus 200 notifies the power transmitting apparatus 100 that transmitted the start notification that the switch to the received power level detection mode is made (S304).

After notifying the switch to the received power level detection mode in step S304, the power receiving apparatus 200 determines whether or not the first transmission power PTrans(k) is received (S306). The power receiving apparatus 200 can perform the determination of step S306 by, for example, detecting the voltage change at the antenna end of the antenna circuit 250 of the power reception unit 204, but is not limited thereto.

If determined that the first transmission power Ptrans(k) is not received in step S306, the power receiving apparatus 200 determines whether or not a predetermined time has elapsed (time out) (S314). If determined that the predetermined time has not elapsed in step S314, the power receiving apparatus 200 repeats the processes from step S306.

If determined that the predetermined time has elapsed in step S314, the power receiving apparatus 200 terminates the received power level detection mode (S316: transition process to normal operation mode). Here, the power receiving apparatus 200 can terminate the received power level detection mode by causing the control unit 216 to stop the transmission of the control signal to the switching unit 214, invalidating the received power level detection unit 212 (e.g., disconnect with power reception unit 204), and validating the load circuit 210 (e.g., connect with power reception unit 204). The termination of the received power level detection mode in step S316 is comparable to switching to the normal operation mode.

When the received power level detection mode is terminated in step S316, the power receiving apparatus 200 notifies the power transmitting apparatus 100 that the received power level detection mode is terminated (operating in the normal operation mode). The power receiving apparatus 200 then terminates the received power information transmission process.

If determined that the first transmission power Ptrans(k) is received in step S306, the power receiving apparatus 200 determines whether or not the received first transmission power Ptrans(k) meets a predetermined level (S308). The power receiving apparatus 200 can perform the determination of step S308 based on the detection result output from the received power level detection unit 212.

If determined that the predetermined level is met in step S308, the power receiving apparatus 200 repeats the processes from step S306. Although not shown in FIG. 15, the power receiving apparatus 200 may notify the power transmitting apparatus 100 that the predetermined level is not met when determined that the predetermined level is not met in step S308.

If determined that the predetermined level is met in step S308, the power receiving apparatus 200 terminates the received power level detection mode, similar to step S316 (S310: transition process to normal operation mode). The power receiving apparatus 200 transmits the received power information to the power transmitting apparatus 100 that transmitted the first transmission power Ptrans(k) (S312).

The power receiving apparatus 200 detects the received power level of the received first transmission power Ptrans(k), and selectively transmits the received power information to the power transmitting apparatus 100 based on the detection result by using the method for transmitting the received power information shown in FIG. 15. Therefore, the power receiving apparatus 200 can receive from the power transmitting apparatus 100 the power (second transmission power Ptrans0 derived from the information related to power transmission) based on the state related to transmission of power between the power transmitting apparatus 100 and the power receiving apparatus 200.

As described above, the power transmission system 1000 according to the embodiment of the present invention includes the power transmitting apparatus 100 and the power receiving apparatus 200. The power transmitting apparatus 200 increases discretely the first transmission power Ptrans (k) to transmit to the power receiving apparatus 200. When the received first transmission power Ptrans(k) meets the predetermined level, the power receiving apparatus 200 transmits to the power transmitting apparatus 100 the received power information indicating that the received power level meet the predetermined level. The power transmitting apparatus 100 receiving such received power information derives the information related to power transmission (e.g., coupling coefficient κ) based on the first transmission power Ptrans(k) at the time of reception of the received power information and the first power consumption information Prcv. The power transmitting apparatus 100 then sets the second transmission power PTrans0 corresponding to the power desired by the power receiving apparatus 200 based on the derived information related to power transmission and the second power consumption information Prcv0. The second transmission power Ptrans0 takes a value dependent on the coupling coefficient κ (one example of information related to power transmission), as shown in Formula 2. In other words, the power transmitting apparatus 100 can set the second transmission power PTrans0 corresponding to the power desired by the power receiving apparatus 200 to a value corresponding to the state related to transmission of power at before transmission of power. Therefore, in the power transmission system 1000, the power based on the state related to transmission of power between the power transmitting apparatus 100 and the power receiving apparatus 200 can be transmitted from the power transmitting apparatus 100 to the power receiving apparatus 200.

The power transmitting apparatus 100 has been described as a component configuring the power transmission system 1000 according to the embodiment of the present invention, but the embodiment of the present invention is not limited to such embodiment. The embodiment of the present invention may be applied to various apparatuses including a computer such as PC (Personal Computer) and server, disc reproducing device such as Blu-ray (registered trademark) disc reproducer, disc recording/reproducing device such as Blu-ray (registered trademark) recorder and DVD recorder, and game machine such as PlayStation® series.

The power receiving apparatus 200 has been described as a component configuring the power transmission system 1000 according to the embodiment of the present invention, but the embodiment of the present invention is not limited to such embodiment. The embodiment of the present invention may be applied various apparatuses including a computer such as PC, mobile communication device such as mobile telephone and PHS (Personal Handyphone System), video/music reproducing device such as WALK MAN®, imaging device such as digital still camera and digital video camera, and mobile game machines such as PlayStation Portable®.

(Program Related to Power Transmission System 1000)
[Program Related to Power Transmitting Apparatus 100]

The power (second transmission power Ptrans0 derived from the information related to power transmission) based on the state related to transmission of power between the power transmitting apparatus 100 and the power receiving apparatus 200 can be transmitted to the power receiving apparatus according to a program for causing a computer to function as the power transmitting apparatus 100 according to the embodiment of the present invention. Furthermore, the power transmission system 1000 in which the power based on the state related to transmission of power between the power transmitting apparatus 100 and the power receiving apparatus 200 can be transmitted from the power transmitting apparatus 100 to the power receiving apparatus 200 is realized according to a program for causing the computer to function as the power transmitting apparatus 100 according to the embodiment of the present invention.

[Program Related to Power Receiving Apparatus 200]

The received power level of the received first transmission power Ptrans(k) is detected and the received power information is selectively transmitted to the power transmitting apparatus 100 based on the detection result according to a program for causing the computer to function as the power receiving apparatus 200 according to the embodiment of the present invention. Furthermore, the power transmission system 1000 in which the power based on the state related to transmission of power between the power transmitting apparatus 100 and the power receiving apparatus 200 can be transmitted from the power transmitting apparatus 100 to the power receiving apparatus 200 is realized according to a program for causing the computer to function as the power receiving apparatus 200 according to the embodiment of the present invention.

The present application contains subject matter related to that disclosed in Japanese Priority Patent Application JP 2008-117302 filed in the Japan Patent Office on Apr. 28, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

For instance, the power transmitting apparatus 100 for transmitting power and the power receiving apparatus 200 for receiving power have been respectively described above, but the embodiment of the present invention is not limited to such configuration. The power transmitting apparatus and the power receiving apparatus according to the embodiment of the present invention may respectively be a power transmitting/receiving device having a power transmitting function related to power transmitting apparatus 100 and the power receiving function related to power receiving apparatus 200. Effects similar to the power transmission system 1000 described above are derived even when the power transmission system according to the embodiment of the present invention is configured with the power transmitting/receiving device.

The provision of the program (computer program) for causing the computer to function as the power transmitting apparatus 100 or the power receiving apparatus 200 according to the embodiment of the present invention has been described, but the embodiment of the present invention also provides a storage medium stored with such program.

The above-described configuration shows one example of the embodiment of the present invention, and it should be recognized that it also falls within the technical scope of the present invention.

What is claimed is:

1. A power transmitting apparatus comprising:
   a power transmission side communication unit for communicating with a power receiving apparatus for receiving transmitted power;
   a power transmission unit for transmitting power to the power receiving apparatus in a non-contact manner;
   a transmission power information deriving unit for
      increasing discretely a first transmission power to be transmitted from the power transmission unit to the power receiving apparatus, and
      deriving information related to power transmission for determining a second transmission power corresponding to power desired by the power receiving apparatus based on reception, at the power transmission side communication unit, of received power information transmitted from the power receiving apparatus, the received power information indicating that a received power level meets a predetermined level; and
   a transmission power determining unit for determining the second transmission power to be transmitted to the power receiving apparatus based on the information related to power transmission derived by the transmission power information deriving unit.

2. The power transmitting apparatus according to claim 1, wherein the transmission power information deriving unit derives a coupling coefficient with the power receiving apparatus as the information related to power transmission.

3. The power transmitting apparatus according to claim 2, wherein
   the power transmission side communication unit further receives first power consumption information indicating a power consumption desired to detect that the received power level meets the predetermined level in the power receiving apparatus; and
   the transmission power information deriving unit derives the coupling coefficient based on the received power information, and the first power consumption information.

4. The power transmitting apparatus according to claim 3, wherein
   the power transmission side communication unit further receives a second power consumption information indicating a power consumption desired for the power receiving apparatus to operate; and
   the transmission power determining unit determines the second transmission power based on the coupling coefficient derived by the transmission power information deriving unit and the second power consumption information.

5. The power transmitting apparatus according to claim 1, wherein
the transmission power information deriving unit transmits a start notification to start transmission of the first transmission power to the power transmission side communication unit, and
the first transmission power is transmitted from the power transmission unit to the power receiving apparatus after the transmission of the start notification.

6. The power transmitting apparatus according to claim 1, wherein the transmission power information deriving unit incrementally increases the first transmission power to be transmitted from the power transmission unit to the power receiving apparatus, until the power receiving apparatus determines that the received power level of the first transmission power meets the predetermined level.

7. The power transmitting apparatus according to claim 6, wherein the first transmission power is transmitted from the power transmission unit to the power receiving apparatus after each incremental increase.

8. The power transmitting apparatus according to claim 6, wherein the power receiving apparatus notifies the power transmitting apparatus that the power cannot be transmitted from the power transmission unit to the power receiving apparatus, when the power receiving apparatus determines that the received power level of the transmitted first transmission power increased to a maximum value does not meet the predetermined level.

9. The power transmitting apparatus according to claim 1, wherein the second transmission power for transmission to the power receiving apparatus is determined by the transmission power determining unit to satisfy a power requirement of the power receiving apparatus.

10. A power receiving apparatus comprising:
a power receiving side communication unit for communicating with a power transmitting apparatus for transmitting power;
a power reception unit for receiving power transmitted from the power transmitting apparatus in a non-contact manner;
a received power level detection unit for outputting a detection result corresponding to the received power level based on a first transmission power transmitted from the power transmitting apparatus; and
a control unit for transmitting received power information when the received power level meets a predetermined level from the power receiving side communication unit based on the detection result of the received power level detection unit.

11. The power receiving apparatus according to claim 10, wherein the received power level detection unit includes,
a light emitting element, wherein a light emission amount of the light emitting element changes according to a current amount corresponding to the power received by the power reception unit, and
a photoelectric transducer for outputting a detection signal corresponding to the light emission amount of the light emitting element.

12. The power receiving apparatus according to claim 11, wherein the received power level detection unit emits light by the light emission of the light emitting element to an outside.

13. The power receiving apparatus according to claim 10, further comprising
a switching unit for selectively transmitting the power received by the power reception unit to the received power level detection unit in response to a control signal transmitted from the control unit, wherein the control unit transmits the control signal to the switching unit when the power receiving side communication unit receives a start notification to start transmission of the first transmission power transmitted from the power transmitting apparatus.

14. The power receiving apparatus according to claim 10, wherein
the control unit transmits a first power consumption indicating a power consumption desired to detect that the received power level meets the predetermined level, and a second power consumption indicating a power consumption necessary for operation of the power receiving apparatus from the power receiving side communication unit when the power receiving side communication unit receives the start notification to start transmission of the first transmission power transmitted from the power transmitting apparatus.

15. A power transmission method comprising the steps of:
transmitting a first transmission power from a power transmitting apparatus to a power receiving apparatus, the first transmission power being increased discretely by the power transmitting apparatus;
receiving, at the power transmitting apparatus, received power information indicating that a received power level meets a predetermined level, the received power information being transmitted from the power receiving apparatus and based on a reception of the first transmission power at the power receiving apparatus;
deriving, by the power transmitting apparatus, information related to power transmission based on the reception of the received power information, the information related to power transmission being for determining a second transmission power corresponding to a power desired by the power receiving apparatus;
determining the second transmission power to be transmitted to the power receiving apparatus based on the information related to power transmission; and
transmitting the determined second transmission power to the power receiving apparatus.

16. A non-transitory computer readable storage medium tangibly storing a program when executed by a computer processor causes a computer to perform the steps of:
transmitting a first transmission power to a power receiving apparatus;
increasing the first transmission power discretely;
receiving received power information indicating that a received power level meets a predetermined level, the received power information being transmitted from the power receiving apparatus and based on a reception of the first transmission power at the power receiving apparatus;
deriving information related to power transmission based on the reception of the received power information, the information related to power transmission being for determining a second transmission power corresponding to a power desired by the power receiving apparatus;
determining the second transmission power to be transmitted to the power receiving apparatus based on the information related to power transmission; and
transmitting the determined second transmission power to the power receiving apparatus.

17. A power transmission system comprising:
a power transmitting apparatus for transmitting power; and
a power receiving apparatus for receiving power transmitted by the power transmitting apparatus, wherein
the power transmitting apparatus includes, a power transmission side communication unit for communicating with the power receiving apparatus, a power transmission unit for transmitting power to the power receiving apparatus in a non-contact manner, a transmission power information deriving unit for
- increasing discretely a first transmission power to be transmitted from the power transmission unit to the power receiving apparatus, and
- deriving information related to power transmission for determining a second transmission power corresponding to power desired by the power receiving apparatus based on reception, at the power transmission side communication unit, of received power information transmitted from the power receiving apparatus, the received power information indicating that a received power level meets a predetermined level, and a transmission power determining unit for determining the second transmission power to be transmitted to the power receiving apparatus based on the information related to power transmission derived by the transmission power information deriving unit; and the power receiving apparatus includes,
- a power receiving side communication unit for communicating with the power transmitting apparatus,
- a power reception unit for receiving power transmitted from the power transmitting apparatus in a non-contact manner,
- a received power level detection unit for outputting a detection result corresponding to the received power level based on a first transmission power transmitted from the power transmitting apparatus, and
- a control unit for transmitting the received power information from the power receiving side communication unit based on the detection result of the received power level detection unit.

* * * * *